United States Patent
Tai et al.

(10) Patent No.: US 12,254,059 B2
(45) Date of Patent: *Mar. 18, 2025

(54) SYSTEMS AND METHODS FOR MANAGING AN ONLINE USER EXPERIENCE

(71) Applicant: Redfast, Inc., Santa Clara, CA (US)

(72) Inventors: Julian Tai, Hercules, CA (US);
Stephen Mui, Belmont, CA (US);
Rajeev Raman, Los Gatos, CA (US);
Eduardo Marconato Sasso, Santa Cruz, CA (US)

(73) Assignee: Redfast, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,477

(22) Filed: Jan. 19, 2024

(65) Prior Publication Data

US 2024/0241919 A1    Jul. 18, 2024

Related U.S. Application Data

(63) Continuation of application No. 17/170,765, filed on Feb. 8, 2021, now Pat. No. 11,893,076.

(51) Int. Cl.
*G06F 16/958* (2019.01)
*G06F 8/71* (2018.01)

(52) U.S. Cl.
CPC .............. *G06F 16/958* (2019.01); *G06F 8/71* (2013.01)

(58) Field of Classification Search
CPC .................................. G06F 16/958; G06F 8/71
See application file for complete search history.

(56) References Cited

U.S. PATENT DOCUMENTS

| | | |
|---|---|---|
| 6,684,369 B1 | 1/2004 | Bernardo et al. |
| 9,208,135 B1 | 12/2015 | Lopez |
| 10,339,560 B2 | 7/2019 | Bafna et al. |
| 11,893,076 B2 * | 2/2024 | Tai .......................... G06F 8/71 |
| 2002/0116413 A1 | 8/2002 | Clark |
| 2006/0162071 A1 | 7/2006 | Dixon et al. |
| 2006/0248442 A1 | 11/2006 | Rosenstein et al. |

(Continued)

OTHER PUBLICATIONS

International Search Report and Written Opinion for International Patent Application No. PCT/US2020/050217, dated Dec. 9, 2020 (12 pages).

(Continued)

*Primary Examiner* — Thu V Huynh
(74) *Attorney, Agent, or Firm* — Goodwin Procter LLP

(57) ABSTRACT

Systems and methods are described for monitoring and managing an online experience. An example method includes: providing a platform to a plurality of operators of a plurality of websites, the platform including a graphical user interface tool; providing the graphical user interface tool to an operator from the plurality of operators while the operator is browsing a website from the plurality of websites; receiving, using the graphical user interface tool, a selection from the operator including an identification of (i) an element to be added to the website and (ii) a location in the website where the element will be added; in response to the selection, automatically revising software code for the website to include the added element at the location; and implementing an updated version of the website using the revised software code.

20 Claims, 24 Drawing Sheets

(56) References Cited

U.S. PATENT DOCUMENTS

| | | |
|---|---|---|
| 2009/0013244 A1 | 1/2009 | Cudich et al. |
| 2010/0318894 A1* | 12/2010 | Billharz ................ G06F 40/166 |
| | | 715/255 |
| 2013/0019189 A1 | 1/2013 | Stewart et al. |
| 2013/0073388 A1 | 3/2013 | Heath |
| 2013/0104026 A1* | 4/2013 | Reynar ................ G06Q 30/02 |
| | | 709/217 |
| 2014/0304682 A1 | 10/2014 | Taylor et al. |
| 2015/0120917 A1 | 4/2015 | Gabrielson et al. |
| 2015/0213026 A1 | 7/2015 | Seifert et al. |
| 2016/0358188 A1 | 12/2016 | Rosales et al. |
| 2017/0083495 A1 | 3/2017 | Wan |
| 2017/0371849 A1 | 12/2017 | Levi et al. |

OTHER PUBLICATIONS

International Search Report and Written Opinion for International Patent Application No. PCT/US2022/015598, dated Apr. 7, 2022 (7 pages).
U.S. Appl. No. 18/604,658, filed Mar. 14, 2024, Systems and Methods for Managing an Online User Experience, Raman.

* cited by examiner

Usage Tracking

Redfast provides automated tracking of visits and minutes and allows you to customize additional tracking of various features within your app/site. Using a tag manager, add the following tag to your app. Please consult docs for mobile and connected TV instructions.

Customize Tracking

Provide details for the item you wish to track. Refer to the documentation for additional information.

◉ REDFAST                                                                                          ∧

Redfast Tracker
Create your own usage tracking on Redfast platform.

| Label | Description | Type | Value | | | |
|---|---|---|---|---|---|---|
| | | | | | + Add New Tracker | |
| visits | Specify a range of visits. Vis... | number | | | | |
| minutes | Specify a range of minutes. Mi... | number | | | | |
| Add to Favorites | | track | .favorite-btn | | Edit | X |
| Subscribe Button | | track | .btn.btn-green-pro btn-slider-... | | Edit | X |
| Signup Step | | page | /signup-step1 | | Edit | X |
| Download Button | | track | .dnld-button | | Edit | X |
| Movie Fans | | page | /movies | | Edit | X |
| Rogue One Fans | | track | .dashboard-movie-profile | | Edit | X |
| Custom Usage Tracker | | custom | | | Edit | |

FIG. 2

Actions Details

API and External Actions                                    + Add Action

Actions will be executed in order. Drag and drop to change order

| | Priority | Status | Interaction | Provider | Description | Value | |
|---|---|---|---|---|---|---|---|
| ⋮⋮ | 1 | ⊙ | primary accept | A | Unsubscribe the user from a specific plan | • Error Behavior: continue<br>• Plan: VIP | ✎ ✕ |
| ⋮⋮ | 2 | ⊙ | primary accept | B | Send dynamic template email to user email address | • Error Behavior: continue<br>• Template: Exclusive Access Invitation | ✎ ✕ |

Website Actions

┌ Redirect upon accept url path ────────┐   ┌ Website Action upon primary accept ┐   ┌ Website Action upon decline ──┐
│ e.g.: /company/homepage               │   │ None                             ▶ │   │ Open Page in New Tab        ▶ │
└───────────────────────────────────────┘   └────────────────────────────────────┘   └───────────────────────────────┘

┌ Website Action upon secondary accept ─┐   ┌ Website Action upon dismiss ──────┐   ┌ Website Action upon timeout ──┐
│ Selection action                    ▶ │   │ Select action                   ▶ │   │ Select action               ▶ │
└───────────────────────────────────────┘   └────────────────────────────────────┘   └───────────────────────────────┘

Close        💾 Save

SYSTEMS AND METHODS FOR MANAGING AN ONLINE USER EXPERIENCE

CROSS-REFERENCE TO RELATED APPLICATIONS

This application is a continuation of U.S. patent application Ser. No. 17/170,765, filed Feb. 8, 2021, the entire contents of which are incorporated by reference herein.

BACKGROUND

The following disclosure relates to systems and methods for monitoring and managing an online experience and, in certain examples, to systems and methods that enable online services to provide customized user experiences based on user interactions with the online services.

A large number and wide variety of online services are available to consumers who use client devices, such as media players, desktop computers, mobile phones, and smart TVs to access the services over the Internet. A streaming service provider, for example, can offer online streaming of movies, television programs, and/or music through a free or subscription-based service. Alternatively, users can download entire content files to their client devices prior to viewing or experiencing content. In addition to movies, television, and music, consumers can access online services related to gaming, e-commerce, communications, financial services, education, news, online storage, billing, customer relationship management (CRM), and/or marketplace online services. There is a need for an online service provider to provide an improved online experience by ensuring that users are taking advantage of all available benefits in the online service, to ensure higher user retention and more active user engagement with the online service. This is especially true for operators trying to improve engagement across multiple platforms. For example, users typically receive a fragmented experience when switching between two online service platforms, such as a service provider's website and a TV platform. Information about a user's behavior on the website is generally not used to improve user engagement on the TV platform.

SUMMARY

Systems and methods are described for managing an online experience for users of one or more online services. An example method includes: providing a platform to a plurality of operators of a plurality of websites, the platform including a graphical user interface tool; providing the graphical user interface tool to an operator from the plurality of operators while the operator is browsing a website from the plurality of websites; receiving, using the graphical user interface tool, a selection from the operator including an identification of (i) an element to be added to the website and (ii) a location in the website where the element will be added; in response to the selection, automatically revising software code for the website to include the added element at the location; and implementing an updated version of the website using the revised software code.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 2 is a screenshot of an example graphical user interface that allows an operator of an online service to specify combinations of traits or user segments to be tracked in the online service, according to an exemplary embodiment.

FIG. 4 is a screenshot of an example graphical user interface that can be used by an operator of an online service to configure one or more actions to be taken in response to user interactions with content presented in the online service, according to an exemplary embodiment.

DETAILED DESCRIPTION

Figure 1:
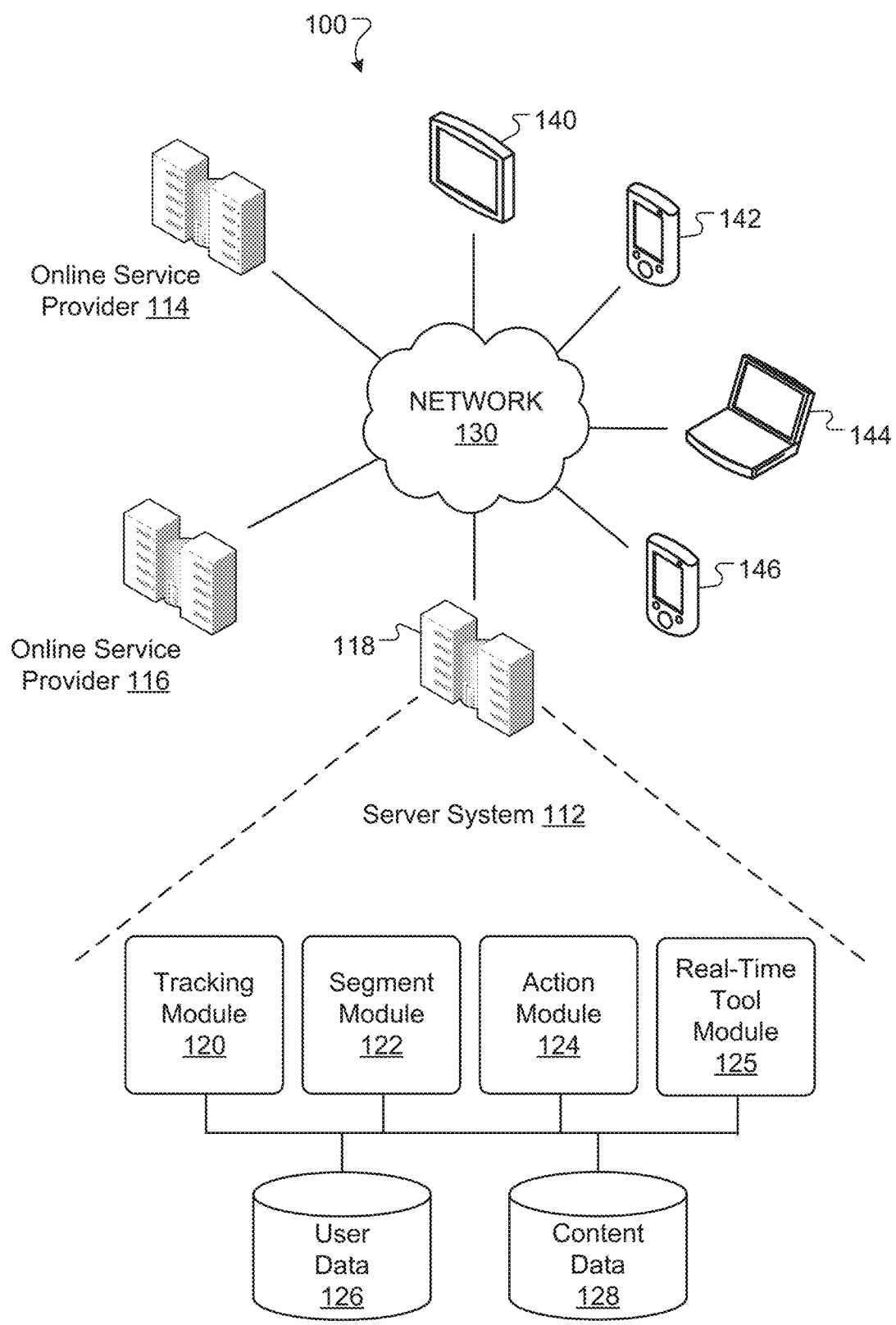
FIG. 1 is a schematic diagram of a system for monitoring and managing an online experience, according to an exemplary embodiment.

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

In various examples, the systems and methods described herein provide a real-time cloud infrastructure platform that enables real-time targeting of users for monitoring and managing an online user experience. The systems and methods can provide highly dynamic software applications (e.g., mobile applications, web applications, or apps), websites, and other online services by, for example, segmenting users into actionable groups and providing one or more of the user segments with customized online experiences (e.g., unique content presentations and/or system features). The systems and methods can provide real-time, dynamic, rules-based paths to manage online content presentations, such that a single online service can deliver multiple experiences to different user segments. This can enable, for example, a differentiated experience for high value users versus fraudulent users, or customized experiences based on, for example, time of day, content availability, a user's lack of use of certain features of the online service, or other measurable business dimensions.

In various examples, a "user" or "consumer" can be or refer to a person who uses or accesses an online service (e.g., using a website or an "app," such as a mobile application, a desktop application, or a TV application) that is monitored and managed using the systems and methods described herein.

In various examples, a "customer" or "operator" can be or refer to an individual, company, organization, or other entity that owns or operates an online service accessed by users. The operator can utilize the systems and methods described herein to provide an improved or customized user experience in the online service.

In various examples, a "trait" can be or refer to an individual user attribute and/or behavior exhibited by a user. A trait can be or include, for example, a device type, a lifetime value (LTV), a fraud score, a churn score, a net promoter score (NPS), and/or a customer satisfaction score. Traits can include system traits that are provided by the systems described herein, such as geographical location, or custom traits that are unique to an online service, such as, for example, the number of times the user has accessed a specific feature or area of the online service, or annual revenue per user (ARPU). Traits can be aggregated or grouped into categories, such as, for example, device types, device locations, user characteristics, and/or other categories. Custom traits or trait categories can be specified by an operator.

In various examples, a "segment" can be or refer to a group of users that share a common set of traits. A segment can be or include, for example, a group of users sharing one or more of the following traits: high LTV, high NPS scores, high fraud scores, users in a trial subscription, trialist users with heavy usage, users making limited use of premium features, all connected TV users in a specified geographical region (e.g., California), a rate of change in the usage of specific features over a specified time period (e.g., a 50% increase week over week), or other traits. A user may belong to more than one segment, and there are generally no limits on the number of segments that may be created or the specific traits that can be combined to form a segment.

In various examples, a "promotion" (alternatively referred to as an "incentive" or "guidance") can be or refer to content (e.g., text, video, images, and/or audio) that is shown or presented to an end user on the user's client device in an effort to incentivize or encourage a desired user behavior and/or to provide guidance to inform the user of one or more features available in an online service. Promotions can be limited to, for example, specific segments of users, a maximum number of users, a time of day, and/or a day of the week. Any and all aspects of a promotion's appearance can be modified or customized by an operator of an online service. A promotion can be implemented in or include, for example, one or more actions taken for one or more segments during a specific time or according to a calendar schedule. A promotion can be limited by a financial budget or a maximum number of users. A promotion can be presented on user client devices via a full screen overlay, a banner, a popup window, or other portion of a webpage or app (e.g., an inline placement).

In various examples, an "action" can be or refer to a task that a promotion or an experience is configured to perform when triggered or accepted by a user. An action can be or include, for example, extending a user's free trial of an online service, adding a discount to a user's purchase, upgrading or downgrading a user's plan, guiding the user on the usage of a feature, providing access to content or areas of a site that might be of interest to the user, reducing or increasing an amount of advertisements shown, and/or opening a support ticket with a customized priority setting. Actions may be performed in a server side or client side manner, depending on the type of operation required.

In various examples, a "path" or "experience" can be or refer to a combination of one or more actions with one or more segments. The experience can remain in place for a specific time duration (e.g., a day, week, or month) or can be implemented according to a timeline or calendar schedule.

Experiences may be invisible to the end user and/or may require no action by the end user to be initiated. For example, experiences can be triggered automatically or by an operator of an online service. In some instances, for example, an operator may activate VIP support and/or reduced ad load for members or users having high LTV.

FIG. 1 illustrates an example system 100 for monitoring and managing an online user experience. A server system 112 provides functionality for monitoring and managing user consumption of online services provided by a plurality of online service providers, including a first online service provider 114 and a second online service provider 116, which can be provided by one or more operators, as described herein. Any number of online service providers can be included in the system 100. The server system 112 includes software components and databases that can be deployed at one or more data centers 118 in one or more geographic locations, for example. In certain instances, the server system 112 is, includes, or utilizes a content delivery network (CDN). The server system 112 software components can include a tracking module 120 for tracking or monitoring user consumption, a segment module 122 for assigning or aggregating users into one or more segments or groups, an action module 124 for taking one or more actions (e.g., generating promotions, popups, or banners) and/or providing user segments with customized or differentiated experiences in the online services (e.g., provided by the online service providers 114 and 116), and a real-time tool module 125 for providing a real-time tool for website editing and user experience emulation, as described herein. The software components can include subcomponents that can execute on the same or on different individual processors or data processing apparatus. The server system 112 databases can include a user data 126 database for storing data associated with one or more users of the online services. Such data can include information describing or relating to each individual user's activities associated with the online services. The server system 112 databases can also include a content data 128 database for storing information related to content (e.g., images, text, videos, etc.) presented in the online services. The user data 126 database and the content data 128 database can reside in one or more physical storage systems. The software components and data will be further described below.

In various examples, the online service providers 114 and 116 can provide online services to a plurality of users. The online services can be provided using, for example, a software application (e.g., a client-based application, such as a mobile or connected TV based application) or a web-based software application (e.g., a web application). The online services can relate to a wide variety of services, functions, and information, including, for example, entertainment (e.g., games, music, videos, movies, etc.), e-health, e-learning, business (e.g., word processing, accounting, spreadsheets, etc.), news, weather, finance, sports, etc. The users can access the online services through a network 130 (e.g., including the Internet) through the use of client devices, such as a tablet computer 140, a smart phone 142, and a personal computer 144. Other client devices are possible. For example, in some instances, the user client devices can include media streaming devices, such as an APPLE TV or a ROKU streaming device. An operator of the online services can use a client device (e.g., client device 146) to provide, modify, or monitor the online services. For example, the operator can use the client device to access the real-time tool described herein. In alternative examples, the user data 126 database, the content data 128 database, or any portions thereof can be stored on one or more client devices and/or in databases associated with the online service providers 114 and 116. Additionally or alternatively, software components for the system 100 (e.g., the tracking module 120, the segment module 122, the action module 124, and/or the real-time tool module 125) or any portions thereof can reside on or be used to perform operations on one or more client devices and/or the online service providers 114 and 116.

In various examples, the system 100 and associated methods can provide a data-driven, real-time retention and engagement platform. The systems and methods can allow operators or managers of websites and apps (e.g., online service providers 114 and 116) to create data-driven retention messaging to end users powered by a rich targeting system that can continuously monitor individual product usage. In some instances, for example, one or more items of content (e.g., promotions) can be triggered based not only on a user's usage characteristics but also based on time on webpages, button clicks, navigation history, or other user characteristics or activities. The system 100 can allow online service providers to build highly dynamic apps and websites, for example, by (i) segmenting users into actionable groups and/or (ii) converting fixed business rules and systems into flexible paths. The approach can be integrated into a backend or server directly (e.g., through experiences) or directly into an app or website (e.g., promotion).

In some implementations, the system 100 can utilize server-side code connections, which can make systems of online service providers highly dynamic and flexible, without complicated logic or programming. This can be achieved by extracting information from business systems or databases and attaching the information to incoming HTTP headers, so that such information can be accessible by the operator's APIs and server side systems. The extracted information can include, for example, user traits, data merged from external databases and APIs, and/or actions defined within a path, as described herein. The architecture of the system 100 can achieve an always-on intelligence that enables online service providers to be more successful, self-sufficient, and/or private and less dependent on congestion-prone single points of processing.

Advantageously, in various instances, by creating a capability for real-time, dynamic rules-based paths to availability, quality, support, and/or promotions, a single app or website can deliver multiple experiences (e.g., customized user experiences) to different user segments, thereby enabling a differentiated or customized experience for different user groups (e.g., high LTV users vs. fraudulent users) or based on time of day, content availability, or any measurable business dimension. The system 100 can achieve these capabilities through the use of usage tracking, traits, actions, triggers, segments, promotions, and/or experiences, as described herein.

Usage Tracking

In certain examples, the systems and methods described herein can improve user retention and engagement for online services by tracking and storing each individual user's consumption of features and content associated with the online services. The systems and methods can measure changes in a user's consumption of one or more features and content over time (e.g., relative to the user's past usage), for example, to determine whether the user is continuing to be engaged with or derive value from the service. In general, a truer picture of the user's consumption of the site emerges when multiple features, content, and/or benefits are combined into a user segment that can be tracked.

For example, a video streaming site may offer users an option to watch content in high quality (e.g., 4K video), download videos, and/or view content on multiple devices in exchange for subscribing to a premium subscription plan. The systems and methods can monitor or determine how many (i) high quality videos a user views, (ii) how many videos the user downloads, and (iii) how many different devices the user uses to access the service. The systems and methods can then calculate changes and rates of change in these quantities (e.g., compared to a previous time period, such as previous day, week, or month) to determine whether the user's rate of content consumption is increasing, decreasing, or staying the same. For example, a rate of content consumption can be determined for each user (e.g., videos per day or downloads per day), and changes in the rate of content consumption can be monitored over time.

In various implementations, content consumption tracking information can be used by the systems and methods to customize a user experience, for example, by determining whether to offer the user an incentive, activate an existing feature, or inform the user about a feature or item of content the user may have missed or may be interested in viewing. For example, an operator of an online service can designate (e.g., using a graphical user interface or admin console) one or more webpages, app screens, buttons, or events on the service that should be tracked. A server (e.g., the server system 112) can then transmit the list of items to be tracked to a client agent or SDK on one or more user client devices (e.g., client devices 140, 142, and 144). Clicks, visits, timestamps, and related information can be collected (e.g., using the SDK) for the tracked pages, buttons, and/or events. The systems and methods (e.g., using the tracking module 120) can analyze the incoming content consumption information and compare the information with prior periods (e.g., days, weeks, or months). Based on the obtained information, the operators of the online services can create one or more user segments, for example, defined by one or more specifications, criteria, and/or thresholds. For example, an online service provider may wish to create a user segment based on consumption of a specific type of content, such as HD content. This can allow the service provider to identify users according to HD content consumption patterns or behavior. It may be important, for example, for the service provider to achieve a weekly 10% increase in HD content consumption among users. Such information can be monitored through the creation of one or more segments.

In certain examples, segments can be defined as a collection of one or more traits (e.g., user attributes or behavior) that can be tracked for each online service. Common traits can include, for example, how often a user visits a website or app, and/or how long the user stays during a visit. Additionally or alternatively, traits can include information related to user devices, locations, and/or business metrics, such as LTV or a customer satisfaction score. In some examples, traits can be normalized, for example, on a 0-10 scale, with a lowest value in the dataset normalized to 0 and a highest value normalized to 10. The normalization can be performed or adjusted in real time as new low values and high values are recorded. Such normalization can enable online service operators to more easily compare usage levels among users, without having to understand site-wide averages, highs, or lows. For example, a heavy user can be defined as a user whose minutes per visit is growing by 30% or more each week.

In some examples, certain traits such as lifetime value (LTV) and/or satisfaction score, can be ingested from an online service provider's data source. This can be accomplished, for example, by obtaining a mapping of a user ID to the trait value (e.g., in a CSV or TSV file). The file can be stored and encrypted, if desired, on a secured database (e.g., Amazon S3) and/or can be ingested on a periodic basis to capture updates. As an alternative to ingesting such a file, trait data can be transmitted (e.g., from an online service provider to the server system 112) via SFTP and API mechanisms and/or scheduled to sync upon a preset frequency.

In some examples, a custom trait can be configured by an operator of an online service provider by specifying certain information, such as: a name or label for the trait (e.g., "Lifetime Value" or "NPS"); a data type (e.g., whether the trait is represented by a number, a Boolean value, a string, or a date); and/or a display type (e.g., a slider, checkbox, dropdown, multi select, range select, or text input box). Traits can include system traits, such as, for example: time in app (e.g., visit duration time spent by the user in the app in MM:SS), number of visits (e.g., number of times per day, week, or month a user visits an online service), geographic location (e.g., city, town, state, country, and/or postal code), device type (e.g., phone, tablet, laptop, desktop, TV, or watch), device OS (e.g., iOS, ANDROID, WINDOWS, or CHROME), connection type (e.g., 3G, LTE, WiFi, and/or carrier name), app version, concurrency level (e.g., a number of unique concurrent sessions using identical login credentials), fraud score (e.g., a number between 0 and 100 ranking the user's likelihood of being a fraudulent user), user ID, days to renewal, and/or referrer (e.g., source website or partner name associated with first time visitors). Custom traits can include, for example, customer LTV (e.g., total time and/or money spent by user since first visit), customer since (e.g., months or years since customer account was created), trial about to end (e.g., true if user is within three days of trial end date), is delinquent (e.g., true if a last billing attempt was unsuccessful), customer satisfaction score (e.g., NPS or like score usually on a 1-10 scale), customer acquisition cost (e.g., a cost to acquire the user, usually determined by a referrer), number of tickets (e.g., for customer support) opened by user, last accessed support channel, purchase urgency (e.g., an indication based on historic data of a user's willingness to acquire an item immediately and for immediate consumption), asset expiration date (e.g., a date and time when an item expires, which can be useful for modifying system behavior related to time sensitive events such as a sporting match or perishable items), and/or support traits (e.g., a number of open tickets, last accessed support channel, customer satisfaction score, or NPS score).

For example, FIG. 2 includes a screenshot 200 of an example graphical user interface that an operator of an online service can use to specify combinations of traits or user segments to track. The graphical user interface allows the operator to create new combinations of traits for future tracking purposes. Desired tracking configurations can be saved for subsequent use. A custom tracker for an item can include, for example, a name (e.g., "Downloads"), a one sentence description of the tracker, a type (e.g., whether the item being tracked is a page, track, or event), and/or a value (e.g., a value for the item). While a newly added tracker can begin collecting information immediately, it may take time (e.g., up to 24 hours) before the tracker has acquired enough information to produce meaningful results or targeting options.

In various examples, the systems and methods described herein can provide certain default or initial tracking capabilities (e.g., out-of-the-box, without a need for additional configuration by online service providers) related to one or more of the following usage characteristics for online services: number of visits, minutes per visit, location (city, state, postal code), and/or device (type, platform, operating system). Usage tracking can be customized further to track specific user actions within a website, page, or app user interface, such as, for example, a button click or a visited URL.

After data collection has been active for an initial period of time (e.g., two or more weeks), the systems and methods can provide a fraud score and/or a churn score for each user. The fraud score can indicate, for example, a level of fraud associated with a user. In some instances, for example, the fraud score can indicate that a user is a bot and/or a user who has a malicious intent. The fraud score can be a number between zero and 10 representing a likelihood that a user is a fraudulent user. The fraud score can be computed in real time for every visitor to the online service and can be available as a trait upon user arrival to the service.

Fraud calculations can be reputation-based, rules-based, or machine learning based. The reputation-based approach can involve calculating fraud scores utilizing known deny list databases from a variety of sources. Typical information for this purpose can include device identifier, email address, IP address, and/or phone number. The rules-based approach can be used to increase or decrease the reputation-based bases score according to one or more rules applied to various user characteristics. For example, the use of anonymizers with certain foreign IP addresses may be indicative of fraud and may boost the fraud score by 10%. The machine learning based approach for calculating the fraud score can be done in a supervised manner, for example, in which feature engineered data sets are fed to an active classifier to produce the fraud score. Behaviors specific to usage of an online service can be implemented using this method. In some examples, machine learning models can be trained to recognize user activity patterns associated with fraud and, once trained, the models can receive activity data for a user as input and provide the fraud score as output.

Additionally or alternatively, the churn score can indicate, for example, a level of churn or inactivity associated with a user. For example, a user who has stopped (e.g., for several days, weeks, or months) visiting an online service or accessing one or more available features or content can have a high churn score for that service. The churn score can be a number (e.g., between zero and one) indicating a probability or likelihood that a user will churn (e.g., stop using or leave an online service). Machine learning models can be used to calculate the churn score based on historic data about users who have churned from the service. For example, historic churn data can be imported and a custom trait can be provided that indicates a user's retention status. The custom trait can be or include, for example, a date that a user's membership ended or will end, and/or a field denoting whether a user is active or churned. In various examples, machine learning models can be trained to recognize user activity patterns associated with churn and, once trained, the models can receive activity data for a user as input and provide the churn score as output.

Actions

In various examples, an action can be or include one or more steps that are performed (e.g., in an online service) based on a user's interactions with content, such as a promotion. The action can be or include, for example, preparing and sending an email to a mailing list each time a user accepts a promotion. The email can contain actionable details for an agent to perform the required promotion such as, for example, applying a discount or extending a membership. An action can be an item (e.g., an item of content or a user setting or status) within an application frontend or backend (e.g., on a client device or server, respectively) that can be dynamically altered and/or provided to a user. Examples of such items can include implementing coupons and associated content, support channels (e.g., customer support services available for only certain users), or changes to trial duration (e.g., extending a user's free trial). Such action items can be specified as a name-value pair and can be available to the frontend or backend (e.g., as an HTTP header). Actions can trigger modifications to backend business systems or applications based on criteria specified within segments. This can be used, for example, to disable promotion codes for users in a high fraud score segment.

One type of action that can be taken can be referred to as a "hidden action," which can involve taking steps to modify a standard user experience for one or more (e.g., users in a segment). The experience for users in a free tier (e.g., a trial subscription) may be adjusted, for example, such that these users receive a customized experience (e.g., more advertising or promotion content), compared to other users in a paid tier, or have trial periods automatically extended due to limited use. In some implementations, an operator of an online service that is targeting specific sets of users (e.g., utilizing segmentation and usage consumption tracking) can provide a customized user experience using hidden actions implemented using the systems and methods described herein. Hidden actions can allow the operator to specify a set of real-time actions that can automatically trigger when a targeted set of users is utilizing the online service (e.g., website or app).

In various examples, hidden actions can utilize or include third party connector actions, custom connector actions, and/or user experience properties. With third party connector actions, the systems and methods can interface with a set of online services to perform user specific actions on the services' behalf. Such actions can include, for example, adding a user to an email campaign or support ticket, or creating an individualized user coupon (e.g., including image or video content). With custom connector actions, an operator of an online service can configure the systems and methods to call an existing API on the backend (e.g., on a server) of the operator's system using appropriate authentication and API parameters, preferably in such a manner that no engineering changes are required on the operator's system. Additionally or alternatively, user experience properties can allow an operator of an online service to define properties that signal the service (e.g., app and/or website) to modify or customize the experience for a specific user. Such modifications can include, for example, adjusting a display banner or video ad load, providing improved content quality (e.g., UHD quality video streams) for high value users, and/or providing cosmetic updates for certain users (e.g., VIP users). The cosmetic updates can include, for example, one or more changes to a layout, color scheme, text, images, video, or audio in a graphical user interface for the users.

In some examples, to implement a hidden action, an operator of an online service can use a console (e.g., an admin console or other user interface) provided by the systems and methods described herein to specify one or more segments that will receive a set of actions associated with the hidden action. The operator can use the console to specify an order in which the actions are performed. When a user logs in or visits the online service, the systems and methods described herein can determine (e.g., in real-time) which segment(s) the user belongs to. If the user belongs to a segment having an associated hidden action, the systems and methods can execute the associated actions (e.g., external and/or API actions) in the order specified. In some instances, when the hidden action or promotion contains client-side actions, such actions can be returned by the server for execution on a client device (e.g., a client SDK embedded within the user's app or browser). In some instances, when a user is determined to be in a free tier, the systems and methods can initiate an external API action (e.g., to an ad server) to configure a parameter that controls how many ads should be shown to the user. Custom hidden actions also exist and once programmed can interact with the operator's service. This can be used to provide macroinstructions, such as automatically filling in a coupon code on behalf of the user.

In some instances, rather than or in addition to initiating a single action (e.g., a subscribe action) in response to a user's interaction with content (e.g., acceptance of guidance or a promotion), it can be desirable to initiate a series of sequential actions, which can be referred to herein as "cascading actions" or "cascading 1-click actions." The sequence of actions can include, for example, a subscribe action, followed by changing a user status (e.g., to VIP status), followed by sending an email to the user (e.g., notifying the user of the status change). The systems and methods described herein are configured to enable an operator of an online service to define and implement cascading actions, which can include any combination of actions that may be modified at any time.

Figure 3:
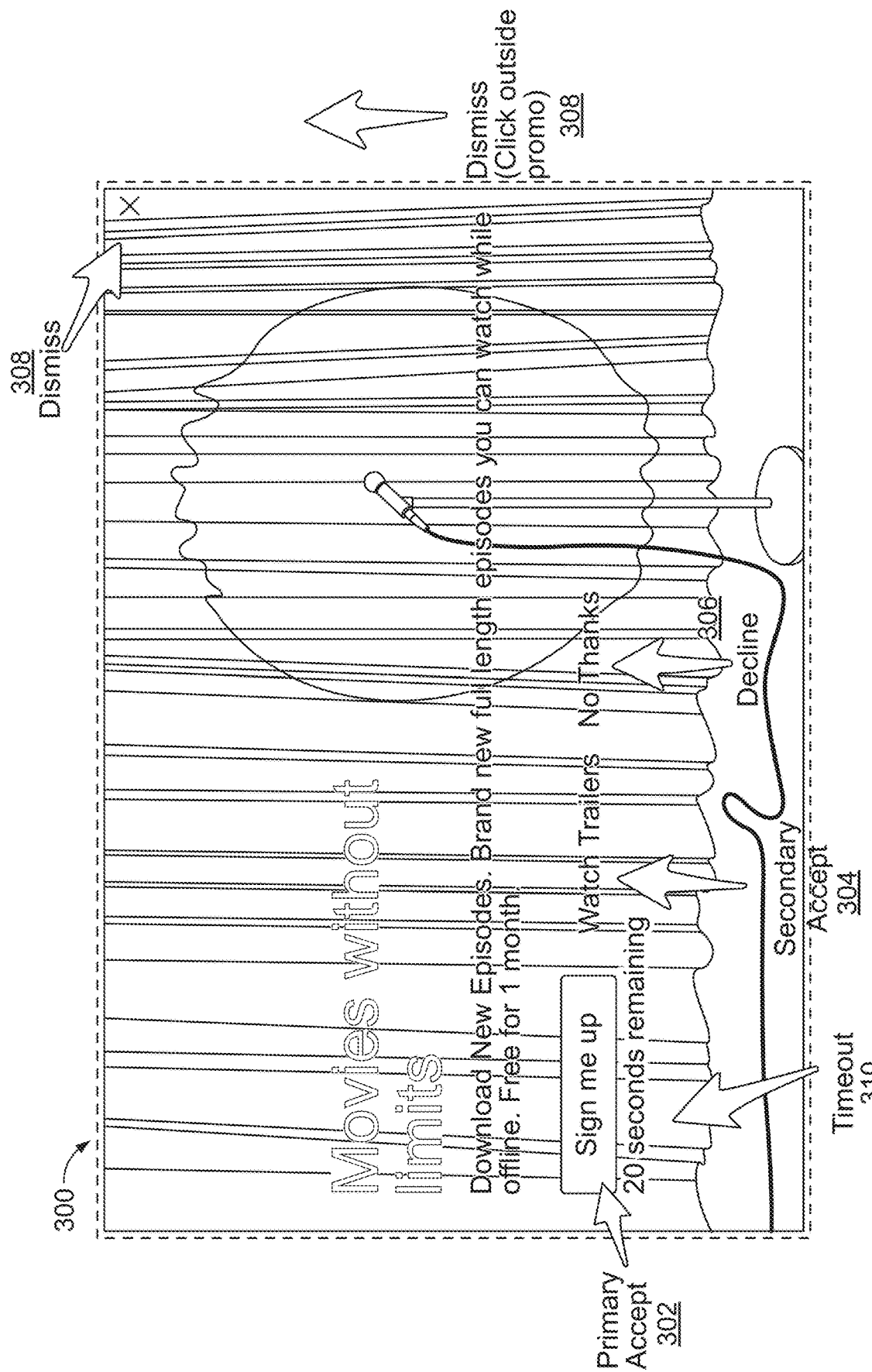
FIG. 3 is a screenshot of an example item of content presented to a user of an online service, according to an exemplary embodiment.

FIG. 3 includes a screenshot 300 of a promotion or guidance presented to a user. The user has several options for interacting with such content, and each option can trigger a specific set of cascading actions taken in response to the user's interaction. In some instances, for example, a unique or distinct cascading action can be implemented for each type of user interaction, which can include, for example: a primary accept interaction 302 (e.g., a most prominent call to action triggered when a user clicks a "sign me up" or "accept" button), a secondary accept interaction 304 (e.g., a second most desired call to action triggered when a user seeks additional information related to the promotion), a decline interaction 306 (e.g., a user clicks a "no thanks" or "decline" button), a dismiss interaction 308 (e.g., a user closes the promotion), and/or a timeout interaction 310 (e.g., triggered by a configurable countdown timer that closes the promotion when an allotted time expires).

In various implementations, any action or set of cascading actions triggered by a user's interaction with content (e.g., a promotion) can be or include a third party connector action, a custom connector action, and/or a website or client action. With a third party connector action, the systems and methods can interface with a set of third party services to perform user specific actions on the online service operator's behalf. Such actions can include, for example, adding a user to an email campaign or a support ticket, or creating an individualized user coupon. With a custom connector action, an operator of an online service can configure the systems and methods to call an existing API on the online service's backend (e.g., a server computer) with appropriate authentication and API parameters in such a way that no engineering changes are required from the operator. With a website or client action (e.g., on a website or client application), an operator of an online system can configure the systems and methods described herein with a snippet of code that can be executed (e.g., to generate content or a promotion) on a user's client device when the user interaction takes place. This can enable real-time execution of logic that can rely on functionality and user context residing on a client application, yet may not require a recompilation of any application code used by the operator (e.g., on the client device).

FIG. 4 includes a screenshot 400 of an example graphical user interface (e.g., an admin console) that allows an operator of an online service provider to configure one or more actions to take in response to user interactions with content presented in the online service. The actions can include, for example, hidden actions or cascading actions. A unique set of actions can be taken in response to each type of user interaction with the content.

To implement a cascading action, an operator of an online service provider can use the admin console to define one or more actions associated with a promotion. A specific sequence for the actions can be specified, for example, by dragging user-interface elements for the actions into a desired order. An end user who visits the online service and qualifies to receive the promotion (e.g., based on user segment) can trigger the cascade of specified actions on a server computer (e.g., server system 112) for the systems and methods. The server can then call the associated external or custom API to execute the actions (e.g., on the user client device).

In general, after a user accepts a promotion by clicking on a primary or secondary accept call to action, the systems and methods can continue tracking the user's usage to determine whether a goal of the operator has been satisfied. The goal can be defined (e.g., by the operator using the admin console) as a usage consumption tracker and can be attached to or associated with the promotion. Once an operator's defined goal has been met, the systems and methods can include the tracking data in a collection of metrics made available to the operator, so that the operator can track performance of promotions, incentives, or other guidance.

In various examples, the actions performed by the systems and methods described herein can include, for example, built-in actions, custom API actions, website or client actions, connector actions, and/or support actions. Built-in actions can be or include, for example, sending an email (e.g., to a specified address when a user interacts with content), sending an SMS or text message (e.g., to a specified mobile number when a user interacts with content), or redirecting a user (e.g., to a specified URL when a user interacts with content). Custom API actions can allow an operator to specify API-driven actions to the backend (e.g., on a server) of the operator's system. Custom API actions can be or include, for example, registration or sign up, add to favorites or bookmark, purchase, or share. Website or client actions can allow an operator to specify client-side JS actions that can be used within an item of content (e.g., a promotion). Website or client actions can be or include, for example, registration or sign up, add to favorites or bookmark, purchase, or share. Connector actions can be performed within third party business systems or backends. In addition to or instead of third party systems, a connector can be established to the backend of an online service provider, which in turn can enable the online service provider to perform advanced actions within a promotion. For example, a promotion to add a movie to a watchlist or add an item to a cart can be performed automatically or directly in response to one click by the user. Support actions can be or include, for example, showing or hiding a support channel or link to customer service (e.g., by changing a visibility of support channels on an embedded widget), assigning priority to a support ticket (e.g., set the priority to urgent, high, medium, or low) adding information to a ticket (e.g., add the visitor's profile to the ticket, such as user ID, LTV, customer acquisition cost, etc.), adding tags to ticket (e.g., add predefined tags to a user who created tickets through the widget, such as high LTV, VIP, high fraud, etc.), setting ticket state (e.g., setting a status on a ticket to new, open, pending, solved, or hold), and/or adding info to chat (e.g., adding a visitor's profile to chat, such as user ID, LTV, customer acquisition cost, etc.). The systems and methods described herein can include or provide a support module that facilitates dynamic connections between a website and the website's support backend. Depending on the support platform, additional traits like number of tickets for the user, last accessed support channel, and customer satisfaction/NPS score can be supported or considered.

Promotions

In various examples, a promotion or guidance can be or include content that is presented (e.g., in a full screen overlay or inline) to users within one or more segments. The content can hide the page content and/or can occupy most of the available width and height of a user's display screen. All aspects of the promotion content can be configured, including, for example, text, appearance, buttons, actions, color scheme, and interactivity. Promotions can optionally be set to trigger during specific events like a button click, a visit to a specific URL, and/or time on a page. Additionally or alternatively, promotions can be scheduled to appear at a specific date and time and/or be limited to a certain number of users and/or a specific budget (e.g., specified by an operator of an online service). Custom goals can be set on promotions, and such goals can be used to provide visibility into how well the promotion is converting against internal success metrics. In some implementations, an operator can experiment with a promotion using a built in A-B testing capability referred to as "experiments," as described herein. A promotion can be or include, for example, an incentive to upgrade to an annual plan for monthly plan members, a promotion code for users who have not yet made a purchase in an online service, and/or guidance shown to a subscribing user or member who clicks on a "cancel membership" button.

In various examples, the systems and methods described herein can implement a cross-device promotion in which (i) a uniqueness of the promotion can be tracked across all platforms (e.g., mobile, desktop, iOS, ANDROID, website, app, TV, and/or media streaming devices, etc.) that provide the promotion and (ii) any actions taken in response to the promotion can be applied across all platforms. For example, when a user is shown a promotion on a ROKU TV app, the promotion can be tracked across multiple platforms so that the user is not shown the same promotion on a desktop or iOS. Such tracking can be achieved by monitoring and storing user data for each individual user, to obtain a record of each user's interactions with one or more online services.

To implement a cross-device promotion, an operator can use the admin console of the systems and methods described herein to designate a set of device platforms that can be used for a promotion. The devices can be or include, for example, desktop, iOS, mobile, tablet, ANDROID, TV, AMAZON FIRE TV, ROKU, and/or Apple TV. By way of user data import, a unique user identifier can be loaded into the systems and methods such that, when a user arrives on any platform, the user's identifier can remain the same (e.g., a single user identifier used to track a user across all platforms). The user identifier can be used by the systems and methods described herein to determine whether or not to show the user a promotion on one platform that has already been presented to the user on a different platform.

In various examples, a "promotion interaction" can be or refer to interactions with past promotions that are tracked for use in user segments. Such interactions can include, for example, clicking on a button, accepting guidance, declining guidance, closing a promotion, or allowing the promotion to timeout. Promotions of any device platform can be used to build segments according to an operator's specifications. User segments can be created, for example, based on specific promotions that have been presented to users, the specific devices on which the promotions were presented, and/or the user's specific interactions with such promotions. In one example, if a user is shown a promotion on a ROKU TV app over a specific period of time, the user can be added to a segment for that promotion and device combination. Such information can be taken by an operator to determine whether to show a different or same promotion on the user's desktop or iOS. Multiple profiles or segments can be created around the same user according to how the user interacted with previously seen promotions. For example, user segments can be created according to how users interact with content presented in the online services.

Paths

In various examples, a path (alternatively referred to as an "experience") can be or include a guided experience to a targeted user that can be specified based on days, dates, visits, or time of day. Online service providers can have a desire to ensure that new users are progressively made aware of various benefits or features associated with the online services (e.g., for subscribers or members), to ensure that the users have an optimal experience with the service. For example, for a user in a 30-day trial, the online service provider may choose to (i) highlight unique content on the first day (e.g., with fewer ads), (ii) present a unique feature (e.g., content download capabilities) a week later, and (iii) reach out the user directly (e.g., by text, email, or phone) a week before the trial expires (e.g., if the user has not availed herself of all the benefits of the trial). Advantageously, the systems and methods described herein can make it possible for online service operators to programmatically configure and modify this type of experience on each of the respective online service platforms.

To implement a path, an operator can define a number of promotions or other content that will be included within the path. Each promotion can be initiated using a variety of triggers, including, for example: a time sequence in which promotions are presented to the user on a predefined timeline (e.g., with promotions 1, 2, and 3 presented on days 0, 7, and 30, respectively, measured from the user's first visit), a usage-based sequence in which promotions are presented to the user when certain usage thresholds are met (e.g., promotion 1 shown on the user's first visit to the service, promotion 2 shown on the user's third visit, and promotion 3 shown upon the user's first use of a service feature), and/or an interaction sequence in which promotions are presented based on interactions with one or more previous promotions (e.g., promotion 1 shown on the user's first visit, promotion 2 shown on the user's next visit if promotion 1 was accepted by the user, and promotion 3 shown on the user's next visit if promotion 2 was declined). Any combination of time sequence triggers, usage-based triggers, and interaction sequence triggers can be used within a single path. In general, promotions are presented in the order defined within the path. A successive promotion may be shown, for example, only after the sequence trigger condition has been met and/or while the user remains active on the online service. In some examples, a path may be or include a type of promotion that has no visual or interactive elements.

In various examples, a path can be created by combining one or more actions with one or more segments, preferably for a specific duration and/or over a calendar schedule, and with a budgeted limit (e.g., Path=Segment(s)+Action(s)+Schedule(s)+Budget). Paths can include or be implemented to achieve, for example, VIP support with members only deals, extended trials, and/or limited discounts (e.g., VIP Path=High LTV Users+Members Only Deals+VIP Support+Peak Times+Limited to 10,000 Users). Paths can route segments of users to specific journeys through online services, websites, or applications. For example, all users may see a price increase during peak times (e.g., surge pricing), or a red carpet path may provide access to reserved items, premium support, and/or free shipping to VIP users. If a time schedule is specified for a path, then the path may be available only during those times and may expire at the end of the period. If a time schedule is not specified, the path may always be available.

In some examples, a budget for a path may include a user limit, which can be used by an operator to specify a maximum number of unique visitors that will be sent down a particular path. For example, a path called "Red Carpet" may give a special offer to high LTV users but be limited to the first 100 users who access the path.

In general, a user limit can be specified by number, by frequency, and/or by budget. A number limit can allow an operator to specify a maximum number of users who can take action on a promotion or path presented to them. For example, a number limit (e.g., 1000 users) can limit the total number of users (or total number of users in a segment) who receive the promotion. A frequency limit can allow an operator to restrict the total number of times a user can be shown a promotion within a specified period of time. For example, setting the frequency limit to two impressions over 30 days can result in a user seeing a promotion no more than twice over a 30-day period. The 30-day period can start when the first impression is shown. A budget limit can allow an operator to specify a consumable quantity that is decreased with each user action for a promotion or path. Budgets may be specified on a standalone basis or in concert with user limits. Budget limits may be useful when finances are an important consideration. For example, a budget set to $10,000 with a decrement of $10 can be equivalent to a $10,000 budget that is reduced $10 at a time.

In some implementations, a traffic split may be implemented that allows an operator to specify a portion (e.g., a percentage) of users who will be sent down a particular path. For example, a path called "VIP offer" may distribute a service feature to 10% of users in the VIP users segment. This approach can be used to determine how well received an offer is before doing a full rollout.

Schedule

In some examples, a schedule can allow an operator to restrict content, such as a promotion or path, to a specific time schedule. For example, the operator can restrict a promotion or path to be active between Oct. 1, 2020 to Dec. 31, 2020, and further limited to Thursdays, Fridays, and Saturdays between 6 pm and 11 pm. A time schedule can include a date window, a day part, and a time part. The date window can specify, for example, a start date and an end date within which the promotion or path can be active and outside of which the promotion or path can be inactive. The day part can be used to specify days of the week when the promotion or path is active. The time part can be used to specify times of the day when the promotion or path is active. In some examples, an operator can specify whether a schedule is based on a time zone associated with a user's client device or client application or on a time zone associated with the operator.

In some implementations, an omni-channel frequency cap can be implemented that limits how many times a user can see one or more promotions. The promotion frequency cap can enable an operator of an online service to specify a maximum number of times a user can see a single promotion. Likewise, a global frequency cap can enable the operator to specify a maximum number of times a user can see all eligible promotions. For example, for a segment of users, an online service provider may choose to show one promotion once a day and a second promotion twice within a seven day period, with a maximum of 30 promotions in 30 days. Such frequency caps can reduce the number of times a user sees the same promotion, which can help ensure a better user experience with less promotion fatigue. The frequency criteria can be applied automatically to cover over all device platforms used by the online service.

To implement a frequency cap, an operator of an online service provider can use the systems and methods described herein to define a frequency cap on specific promotions (e.g., limit iOS promotion 1 to once per 7 days, limit ROKU promotion 2 to twice per 7 days, etc.). The operator can also define a global frequency cap, if desired (e.g., limit all promotions to 3 times per 7 days). In this example, a user's interaction sequence with content can be as follows: the user visits iOS on Day 1 and receives promotion 1; the user visits ROKU on Day 2 and receives promotion 2; the user visits iOS on Day 3 and receives promotion 1; and the user visits ROKU on day 4 but does not receive further promotions until the global frequency cap resets on day 8.

Experiments

In certain examples, the systems and methods described herein can be used to perform "experiments" that allow online service operators to test variations of a promotion or experience to see which variation results in the greatest positive impact. Operators can specify any number of variations within an experiment but, in general, only one experiment may run on a given promotion or path at a given instant in time. This allows operators to run multiple experiments or trials over time on a single promotion or path. In various implementations, an experiment may be designed to modify one or more of the following parameters associated with a promotion or other item of content, such as, for example: title text, message body text, offer value, confirm button text, and/or cancel button text. An experiment may modify any actions specified within a path. Experiments can allocate users equally to each variation.

Retention Cohorts

In certain implementations, the systems and methods described herein can include a user interface that allows online service operators to compare the activities or status of (i) cohorts of users who have interacted with specific promotions (or guidance or other items of content) with (ii) cohorts of users who have not interacted with the specific promotions and/or have interacted with one or more different promotions. Such comparisons can allow an operator to evaluate the impact such interactions can have on user engagement with and retention in the online service. For example, such comparisons can allow the service operator to determine whether users who interact with promotion A stay with the online service longer than those who interact with promotion B.

Figure 5:
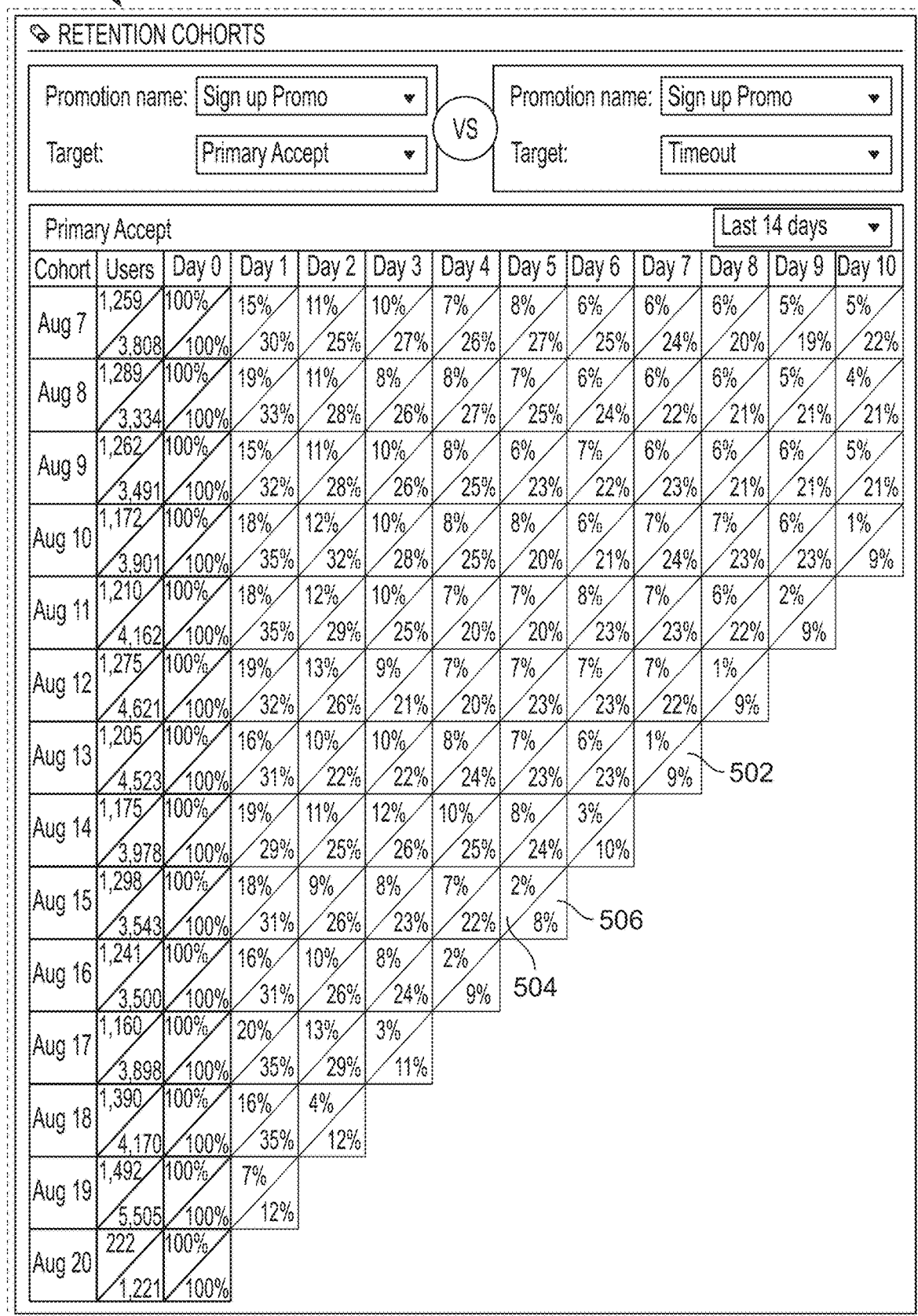
FIG. 5 is a screenshot of an example graphical user interface that allows an operator of an online service to visualize an influence that items of content have on user retention in the online service over time, according to an exemplary embodiment.

FIG. 5 includes a screenshot 500 of an example graphical user interface that allows an operator to visualize the influence that two different promotions, paths, actions, or other items of content have on user retention in an online service over time. Each row in the user interface represents a date, and columns represent days since an initial date. Each cell or row-column combination includes a box 502 formed by two triangles. Numbers in each triangle can provide an indication of user engagement with the online service. One of the triangles 504 (e.g., a top triangle) can represent engagement following one promotion, and the other triangle 506 (e.g., a bottom triangle) can represent engagement following a different promotion. In the depicted example, one of the promotions was more effective at improving user engagement with the online service. Such information can be used by the operator to adjust future content presentations, in an effort to improve user retention.

Pricing

In some instances, the systems and methods described herein can utilize or include a pricing module for connecting to a payment system and/or a CRM system. Such connections can allow user properties such as user LTV and days to next renewal to be retrieved, but the connections may also provide granular control over pricing, coupons, and subscriptions. Pricing traits can include, for example, user LTV, user since (e.g., length of user relationship with service), is delinquent (e.g., true if the last billing attempt was unsuccessful), days to next renewal, and/or trial about to end (e.g., true if trial ends within three days). Pricing actions can include, for example, show/hide coupons (e.g., show or hide the coupon field), show/hide subscription plans (e.g., show only specific subscription plans or hide irrelevant subscription plans), ask payer for credit card postal code (e.g., show a postal code field on a payment form) ask payer for billing address (e.g., show all address fields, such as street address, city, state, postal code), ask payer for phone number (e.g., show a phone number field on the payment form), ask payer for email address (e.g., show an email field on the payment form), and/or increment usage quantity (e.g., add metered billing usage or allow user to view a video 10 times and then charge $100 dollars before allowing for more consumption).

Technology

In certain examples, the systems and methods can provide machine intelligence that enables online service providers to be richer, self-sufficient, more private, and/or less dependent on congestion prone single points of processing. The systems and methods can be an ideal fit for gaming, e-commerce, communications, financial services, entertainment (e.g., movies and music), education, online storage, billing, customer relationship management (CRM), and/or marketplace online services. The systems and methods can be incorporated into or accessed by (i) a website using a tag manager or (ii) an app using a software development kit (SDK). Alternatively or additionally, the systems and methods or portions thereof can be embedded directly on a web server (e.g., as a plugin).

In certain examples, the software and database components of the system 100 can utilize or include client libraries, an admin console, a real-time stream data processor, integrations with various third party business systems (e.g., for billing, support, or CRM services), and/or a webserver plugin. The client libraries can act as data collectors and/or render end user facing content and experiences. A JAVASCRIPT client, for example, can be added using a GOOGLE tag manager or a TEALIUM tag manager, or can be directly integrated into an online service provider's website. The admin console can be or provide a management console and/or nerve center of an online service platform. The admin console can allow operators of online services to configure apps and set up traits, segments, promotions, experiences, and integrations. The admin console can allow operators to view dashboards and run experiments. The real-time stream data processor can dynamically segment incoming traffic into manageable user segments based on rules or machine learning. In some examples, the real-time stream data processor can be incorporated into the tracking module 120 and/or the segment module 122. Additionally or alternatively, integrations with various third party business systems can be achieved that relate to, for example, billing (e.g., STRIPE, APPLE, or ANDROID), support (e.g., ZENDESK, FRESHDESK, or SALESFORCE.COM), and/or marketing (e.g., SENDGRID, CAMPAIGN MONITOR, or MAILCHIMP). These integrations can be used or accessed through third party connectors, as described herein. A webserver plugin can be used to extract crucial information from business systems or databases and securely add such information to incoming HTTP requests (e.g., for handling an online service provider's application server logic).

Figure 6:
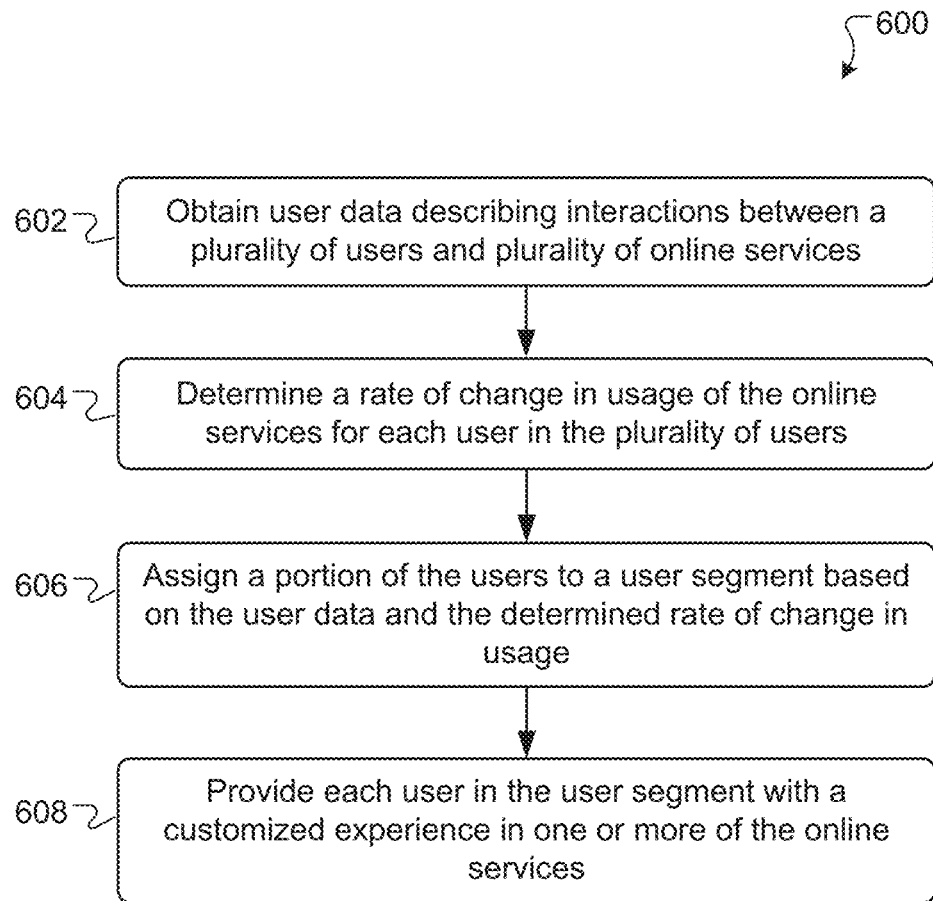
FIG. 6 is a flowchart of an example method of monitoring and managing an online experience, according to an exemplary embodiment.

FIG. 6 is a flowchart of an example method 600 of monitoring and managing an online experience. User data is obtained (step 602) that describes interactions between a plurality of users and plurality of online services. A rate of change in usage of the online services is determined (step 604) based on the user data for each user in the plurality of users. A portion of the users is assigned (step 606) to a user segment based on the user data and the determined rate of change in usage. Based on the assignment, each user in the user segment is provided (step 608) with a customized experience in one or more of the online services.

Real-Time Edit and Review

In various examples, the systems and methods described herein include a real-time tool that can be used by an operator to add elements or content (e.g., Hypertext Markup Language (HTML) snippets, trackers, or triggers) to a website (or other online service), experience the website as it would be experienced by an end user, and/or determine how the end user's traits may influence the experience. The real-time tool can empower operators to make personalized changes to the website or user-facing web application, without having to perform any manual software coding (e.g., HTML programming). The capability is particularly valuable for individuals who operate or manage websites but have limited or no software coding capabilities. For example, a marketing manager or other non-technical operator can use the real-time tool to add a placement of content (e.g., text, images, a window, and/or a hyperlink) to a website for a specified segment of users. Once implemented, users who visit the website can access the added content if they belong to the specified segment. Other users may be unable to access the added content and may instead be presented with a different version of the website. The real-time tool can be implemented using the real-time tool module 125.

In certain implementations, the real-time tool can provide operators with a live edit capability and/or a preview capability (alternatively referred to as an "inspect" capability). The live edit capability can allow the operator to add content (e.g., promotional elements) to an existing website, for example, through point-and-click operations. The added content can augment or improve the website experience for one or more segments of end users. The added content can include, for example, one or more trackers, triggers, and/or placements, as described herein. The preview capability can allow an operator to view or understand a specific user's traits, attributes, and promotions for which the user qualifies. The preview capability can allow the operator to experience a website as a specific end user, for example, by impersonating the user or the user's segment. This can enable the operator to confirm that website features (e.g., including content added using live edit) are being displayed properly to each user segment. In some instances, the operator can ingest user traits for a user segment and experience the website as it would be experienced by the user segment. This can allow the operator to view website content (e.g., promotions and placements) from the perspective of each user or user segment. The live edit and preview capabilities are described in more detail below.

The conventional approach for adding content to a web application or website involves editing underlying software code for the web application (e.g., adding HTML code), and this typically requires computer programming skills and/or a deep technical understanding of the web application. Non-technical individuals who wish to make changes to the web application typically do not have the requisite programming skills, domain expertise, or authority to perform the task.

Figure 7A:
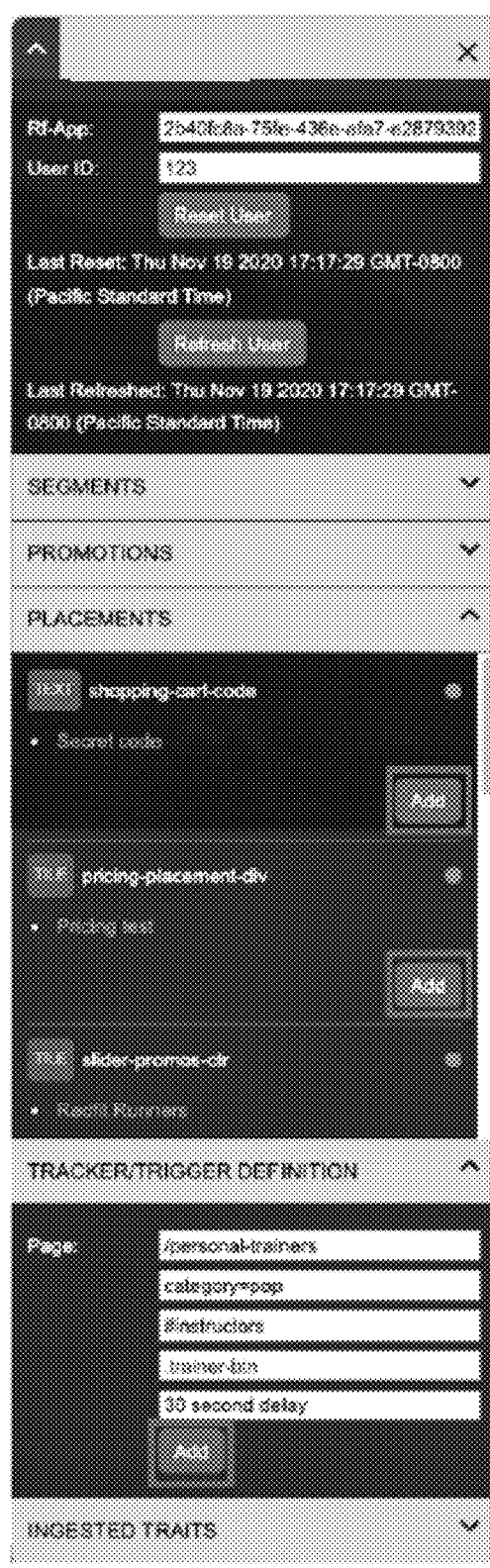
FIG. 7A is a screenshot of an example graphical user interface tool that can be used by an operator of an online service to add guidance and user tracking in real time, according to an exemplary embodiment.

Advantageously, referring to FIG. 7A, the live edit capability described herein can circumvent the need for making manual code changes to the web application by providing the operator with a graphical user interface tool 700 (e.g., alternatively referred to as a real-time placement injector) for easy editing of website content. For example, the graphical user interface tool 700 can allow the operator to insert an HTML tag (through point-and-click operations) while the operator is browsing live on the website or web application. Once website content (alternatively referred to as a "placement") has been added or changed, the operator may choose to make the additions or changes permanent going forward. In such instances, a software development kit (SDK) can be used to automatically generate the placement or other revised website content by dynamically inserting or revising the associated HTML (or other code) for all subsequent eligible end users. The live edit capability can allow content blocks to be added to already-deployed websites, without requiring new code to be deployed to the site. By comparison, previous graphical tools for generating website content cannot be used to modify content on websites that are active or already deployed. Such previous graphical tools can be used only for adding content to websites that are inactive or not yet deployed.

In various implementations, the live edit capability can use JAVASCRIPT (or a similar language) to monitor a webpage so that any added content can be re-published continuously, or as needed, when a designated zone for the content on the webpage is accessed by a user. Previous approaches to building websites may take inserted data and generate a full webpage during a publishing process; however, unlike the live edit capability described herein, such previous approaches do not have a flexible dynamic component that allows website content or data to be edited or added (e.g., from a database and/or in real time) after the website has already been published.

In some instances, the live edit capability can be used to publish real-time micro blocks of interactive content onto an existing website. For example, an operator can create a content block that references a user's name and recites a statement that may be customized based on the user's traits. For example, the content block could recite "Hey John, click here for your unique 25% off offer." The placement can be republished automatically with rules that cause the content to update after several seconds, even if the user never left the webpage. The displayed user name and the statement (e.g., describing an available price discount) can be different depending on the user. By comparison, previous approaches for displaying such content are not user-specific and can be used to recite only a generic statement, such as "Hey visitor, click here for your 10% off offer." Additionally or alternatively, the live edit capability can allow the website to retrieve data related to users from third party service providers, such as, for example, billing service providers (e.g., STRIPE, VINDICIA, or APPLE), support service providers (e.g., ZENDESK), or content management service providers (e.g., SALESFORCE). The content block can present the user with data retrieved from one or more of these third party service providers.

In various examples, the live edit capability can enable an operator to insert an HTML div tag (e.g., defining a section of an HTML document) for a content placement in one or more of the following locations: (i) above an existing HTML tag, (ii) inside a top half of the existing HTML tag, (iii) inside a lower half of the existing HTML tag, (iv) over the existing HTML tag (e.g., to replace the existing HTML tag), (v) to a left side of the existing HTML tag, or (vi) to a right side of the existing HTML tag. The operator can be provided with a visual indication of where the HTML div tag will be inserted, for example, based on a calculated position of the operator's mouse pointer. For example, as the operator moves the mouse pointer over an existing webpage element, the position of the mouse pointer can be determined and used to display a visual indication (e.g., highlighting, a graphical indicator, and/or a text identifier) of where the HTML div tag will be inserted relative to the existing webpage element.

Figure 7B:
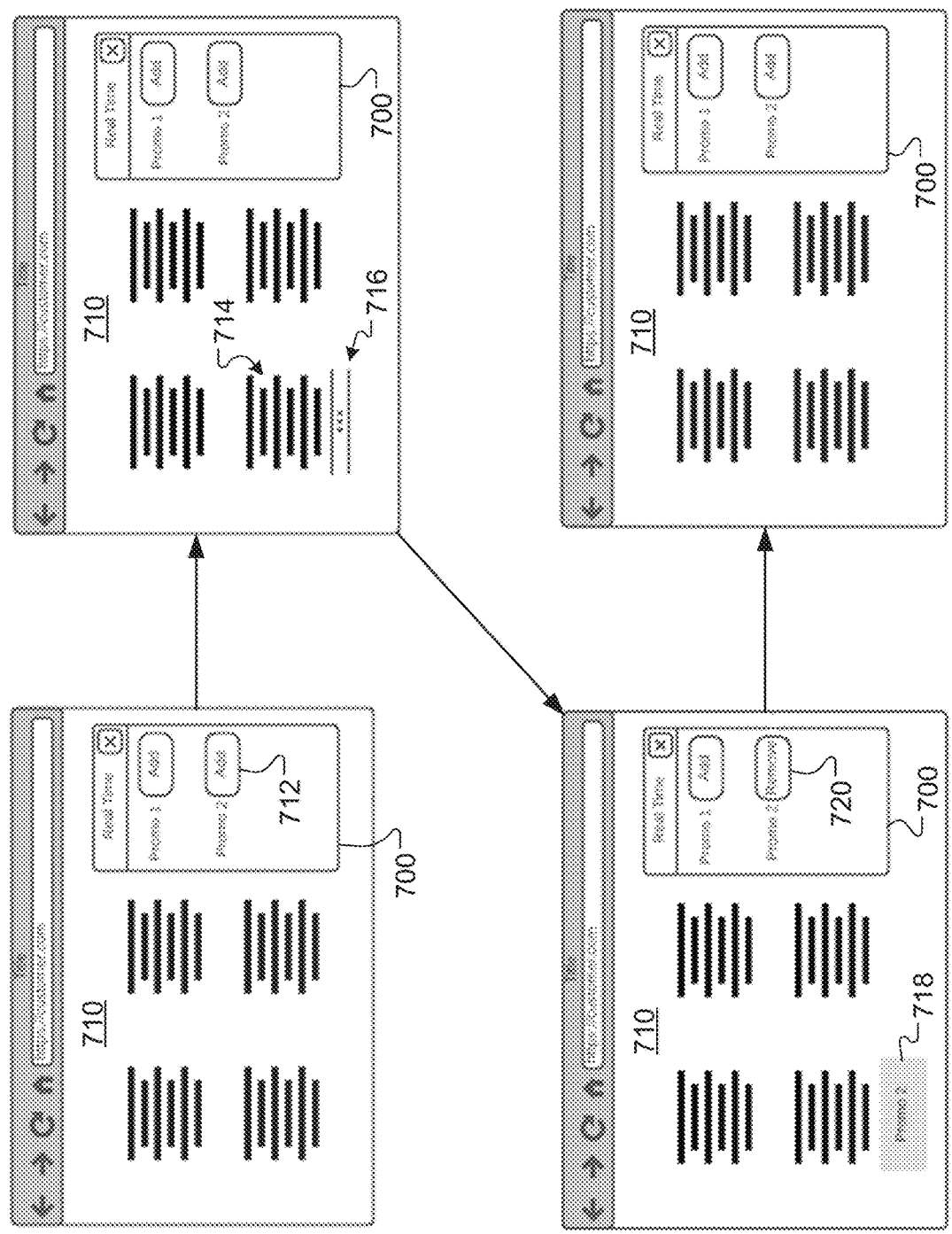
FIG. 7B is a schematic diagram of a method of adding a content placement to a webpage, according to an exemplary embodiment.

For example, referring to FIG. 7B, when an operator accesses the real-time tool, the graphical user interface tool 700 can be displayed as a floating window over a webpage 710 provided by the operator. The operator can then click an add button 712 for an item of content, which can be referred to as "Promo 2." The operator can then hover a mouse pointer over webpage content 714 to determine a placement location for the content. For example, the operator can specify an exact position of the content placement by hovering over elements on the webpage 710. Based on a calculated position of the mouse pointer, one or more graphical indicators 716 or demarcations (e.g., red demarcations) can be displayed to show the chosen location where the placement will be added. The operator can then execute a mouse click to render the placement on the webpage 710. Alternatively, the operator can cancel the placement, if desired (e.g., by hitting an ESCAPE key). Once the placement location has been specified, the webpage display can be updated to show the placement 718 at the chosen location. An SDK for the real-time tool can be used to render the placement 718 and collect metadata, including, for example, a unique CSS selector of a reference element and a relative position on the webpage 710. The SDK can then be used to call an API to persist the metadata in a database (e.g., the content data 128 database) so that the placement 718 can be displayed to regular visitors when the webpage 710 is loaded. To remove the placement 718, the operator can click a remove button 720 in the graphical user interface tool 700. This can cause the SDK to remove the placement 718 from the webpage 710 and to issue an API call that removes the associated metadata from the database.

Figure 7C:
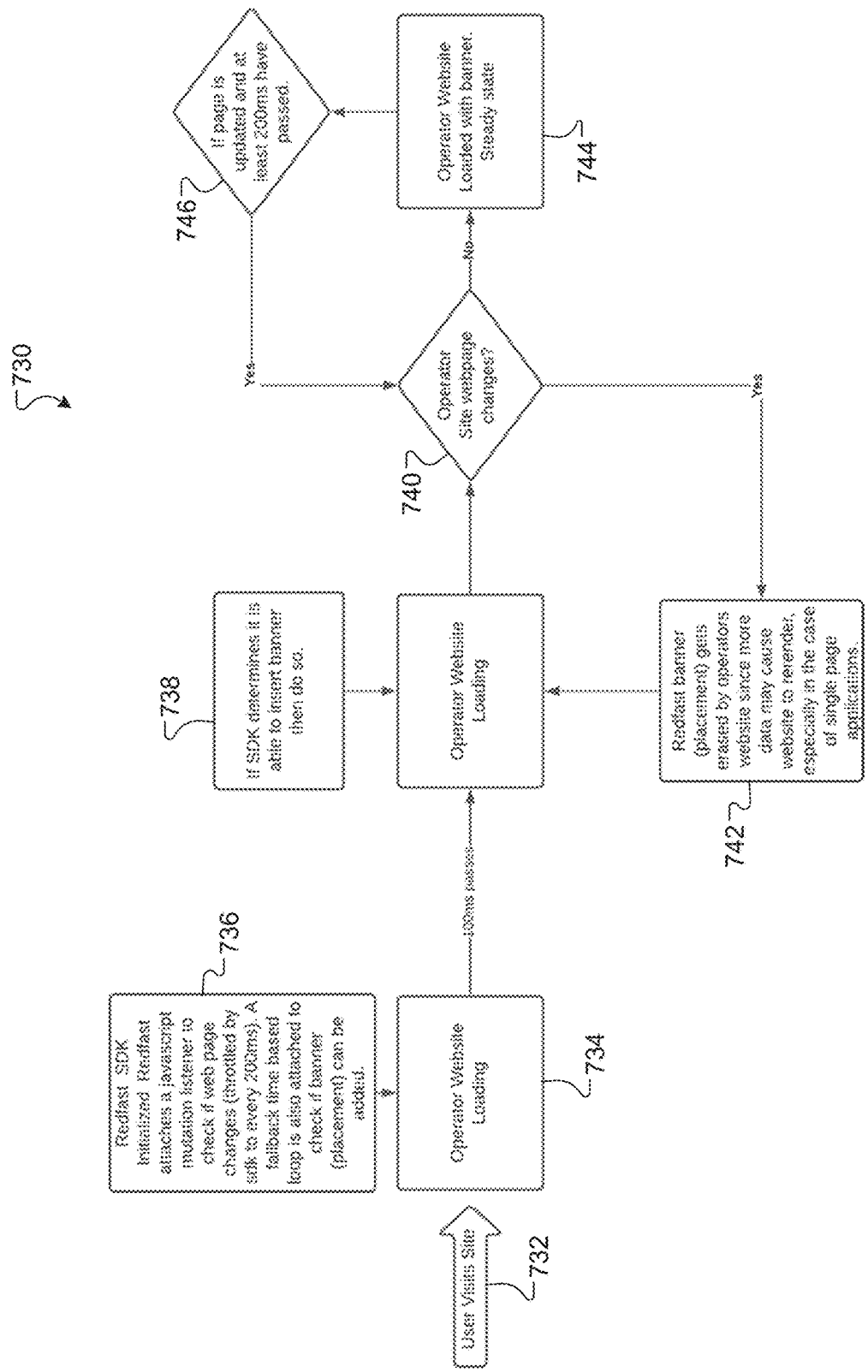
FIG. 7C is a schematic diagram of a method of monitoring a webpage to ensure added content is being rendered properly, according to an exemplary embodiment.

In some instances, an operator website or added content may be rendered only partially, which can result in an unpleasant or jarring user experience. Such issues may occur, for example, when the website uses a single page application framework, such as VUEJS, REACTJS, EMBERJS, or ANGULARJS. Referring FIG. 7C, to address such issues, the webpage can be introspected continuously using a method 730. When a user visits an operator's website (step 732), the website can begin loading (step 734) and the SDK can be used to attach (step 736) a JAVASCRIPT mutation listener to detect any webpage changes (e.g., at periodic intervals, such as every 200 ms). A fallback time-based loop can be attached to determine if a placement (e.g., a banner) can be added. When the SDK determines (step 738) that the placement can be added, the real-time tool can add the placement. The mutation listener can then be used to detect (step 740) webpage changes. For example, the listener can determine (step 742) that a placement has been erased from the webpage, particularly when a single page application is re-rendered. At this point, the SDK can intervene to ensure that the webpage includes the placement (e.g., by adding or re-rendering the placement). Alternatively, when no changes are detected, the mutation listener can determine (step 744) that the webpage with the placement has reached a steady state. The mutation listener can continue monitoring (step 746) the webpage to detect any changes (e.g., related to the placement).

In certain examples, HTML elements can be placed on a page using manually specified coordinates of an HTML coordinate system (e.g., similar to a 4th quadrant in a Cartesian coordinate system). Such absolute positioning of HTML elements can present certain challenges in some instances. For example, when all elements on a webpage are placed with absolute positioning, overlap of one or more elements can occur. For example, a content placement may overlap with one or more other webpage elements. To avoid such overlap, inserted placement items can include a forced height dimension upon load, which the operator's website can use to ensure the placement is included as part of the webpage layout, without overlapping other website elements. When the forced height dimension does not fully address the overlap issue, the website's JAVASCRIPT can be re-instantiated to forcefully modify the webpage layout.

In some instances, loading new webpage content (e.g., added with the live edit capability) or other data above a webpage fold (e.g., an initial view of a webpage before scrolling down) can involve time delays and/or result in a delayed user experience. Such delays can be worse when there is a poor network connection, high latency, or other data transmission issue. To avoid such issues, the systems and methods described herein can enable operators to specify default placement items or data so that a placement item is guaranteed to appear. Additionally or alternatively, a default placement item can be set to disappear with a Cascading Style Sheets (CSS) transition when a specified time has elapsed and no user specific data has been returned. In general, a default placement item can be configured to be displayed for all users and/or a desired segment of users (e.g., an "all users" segment and/or an "anonymous users" segment). An operator can use the real-time tool to configure the default placement item for access by any visitor to the webpage, for example, by attaching all users or the desired segment of users to the default placement item. The real-time tool may create such user segments by default.

In certain examples, the live edit capability can be used to insert trackers or triggers into a website or web application. Trackers can be used to track the website elements and/or webpages that end users interact with, for example, by clicking website buttons, typing text within a form, scrolling, or hovering. A tracker can be used to determine, for example, a number of times a user presses or clicks a button (e.g., a play button for a video, a button to subscribe to a new service, etc.) on a website. This can provide a measure of how engaged the user is with the site. In general, trackers can be placed on any interactive components of a webpage (e.g., to monitor clicking, typing, and/or scrolling). When an operator creates a tracker for a button, for example, the tracker can publish user interactions with the button. For example, a future end user who clicks the button can have the click event sent via a JAVASCRIPT SDK into a backend for the systems and methods described herein (e.g., the server system 112), and the click event can be stored in a database. Referring again to FIG. 1, for example, events monitored with trackers can be sent from a website server (e.g., online service provider 114) or from a user client device (e.g., client device 142) to the server system 112, where the click events can be stored in a database (e.g., the user data 126 database and/or the content data 128 database).

Similarly, triggers can be used to initiate the presentation of promotions or other website content. When a user activates a trigger, for example, website content associated with the trigger (e.g., offers, images, videos, etc.) can be launched. Previous approaches to adding trackers and triggers can involve the manual addition of software code, such as JAVASCRIPT or HTML. Advantageously, however, the live editor can allow operators to add triggers and trackers graphically (e.g., through point-and-click operations), without having to make any manual additions or changes to software code. The live editor can automatically determine the page of an application or website by introspection of data on the page. Further, clicks and other website interactions can be designated directly from the graphical user interface tool 700 to formulate complex tracking or triggering without the need for manual programming. For example, an operator can use the graphical user interface tool 700 to specify the particular website interactions that are tracked and/or that activate a trigger.

Figure 7D:
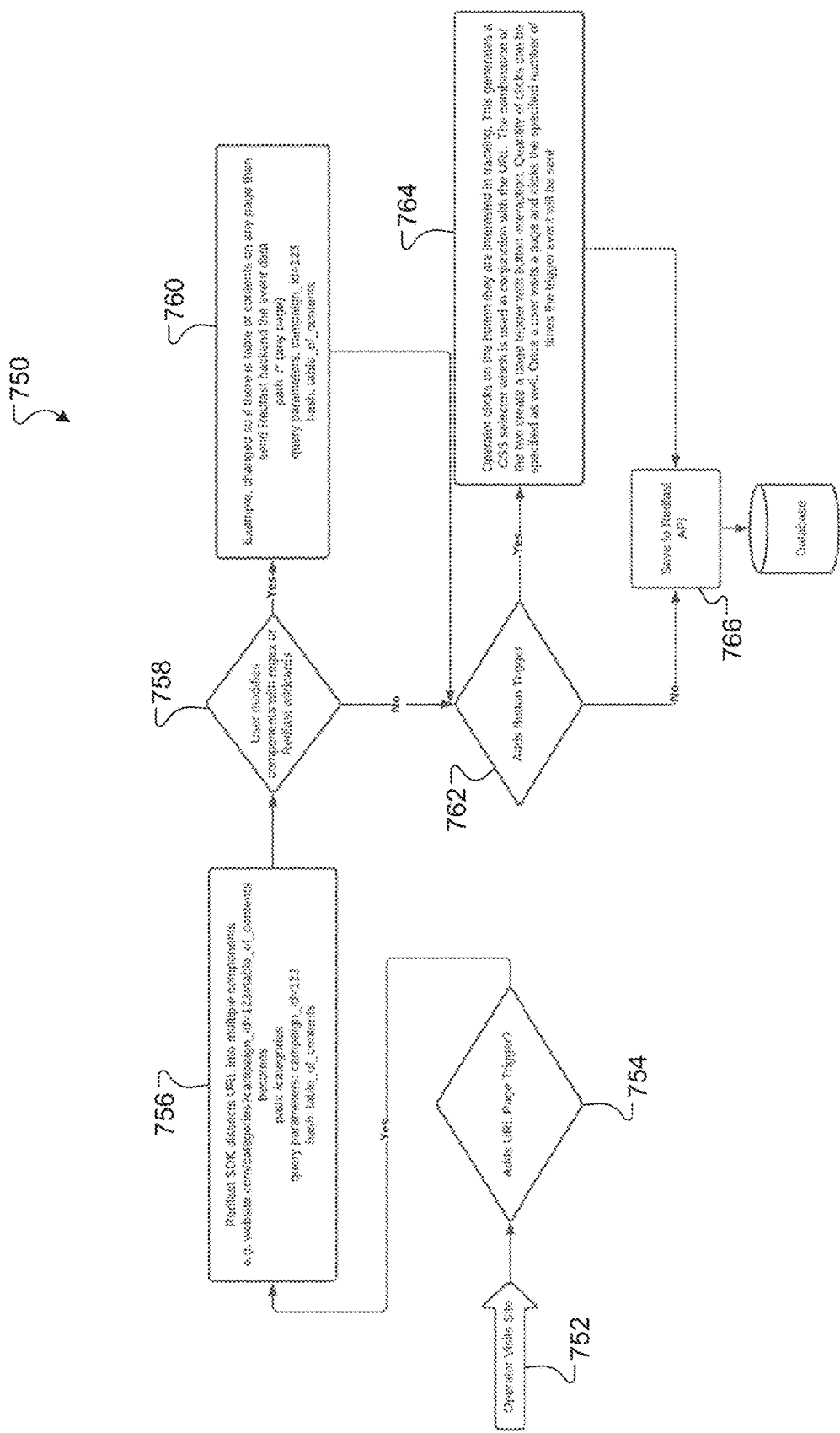
FIG. 7D is a schematic diagram of a method of adding a trigger to a website, according to an exemplary embodiment.

FIG. 7D illustrates an example method 750 of adding a trigger to a website. An operator visits (step 752) a website managed by the operator and adds (step 754) a URL page trigger (e.g., using the graphical user interface tool 700). The SDK for the systems and methods described herein can then be used to dissect (step 756) the URL into multiple components. For example, website.com/categories?campaign_id=123#table_of_contents can become: path=/categories; query parameters=campaign_id=123; and hash=table_of_contents. The operator or user may then modify (step 758) the components with a regular expression (REGEX) or various wildcards. For example, the components can be modified (step 760) to make path=/* (any page), such that, if a table of contents is present on any page of the website, this event data (e.g., a web address or URL) for the page can be sent to a backend of the systems and methods described herein (e.g., the server system 112). The operator can then add (step 762) a button trigger, for example, by clicking (step 764) on a button the operator is interested in tracking. This can generate a CSS selector that is used in conjunction with the URL. The combination of the two can create a page trigger with button interaction. Quantity of clicks can be specified by the operator, if desired. Once implemented, for example, when a user visits the page and clicks the button the specified number of times, a trigger event can be sent and a corresponding promotion can be activated or appear on the page. The trigger implemented by the operator can be saved (step 766) to an API and/or a database (e.g., the content data 128 database) for the systems and methods described herein. In some examples, event data can include a web address (URL) and/or one or more user interactions with an online service (e.g., a webpage), such as clicks, page visits, scrolls, typing in an input field, and the like. Such event data can be stored in a database (e.g., the content data 128 database) for use by the systems and methods described herein.

Figure 8:
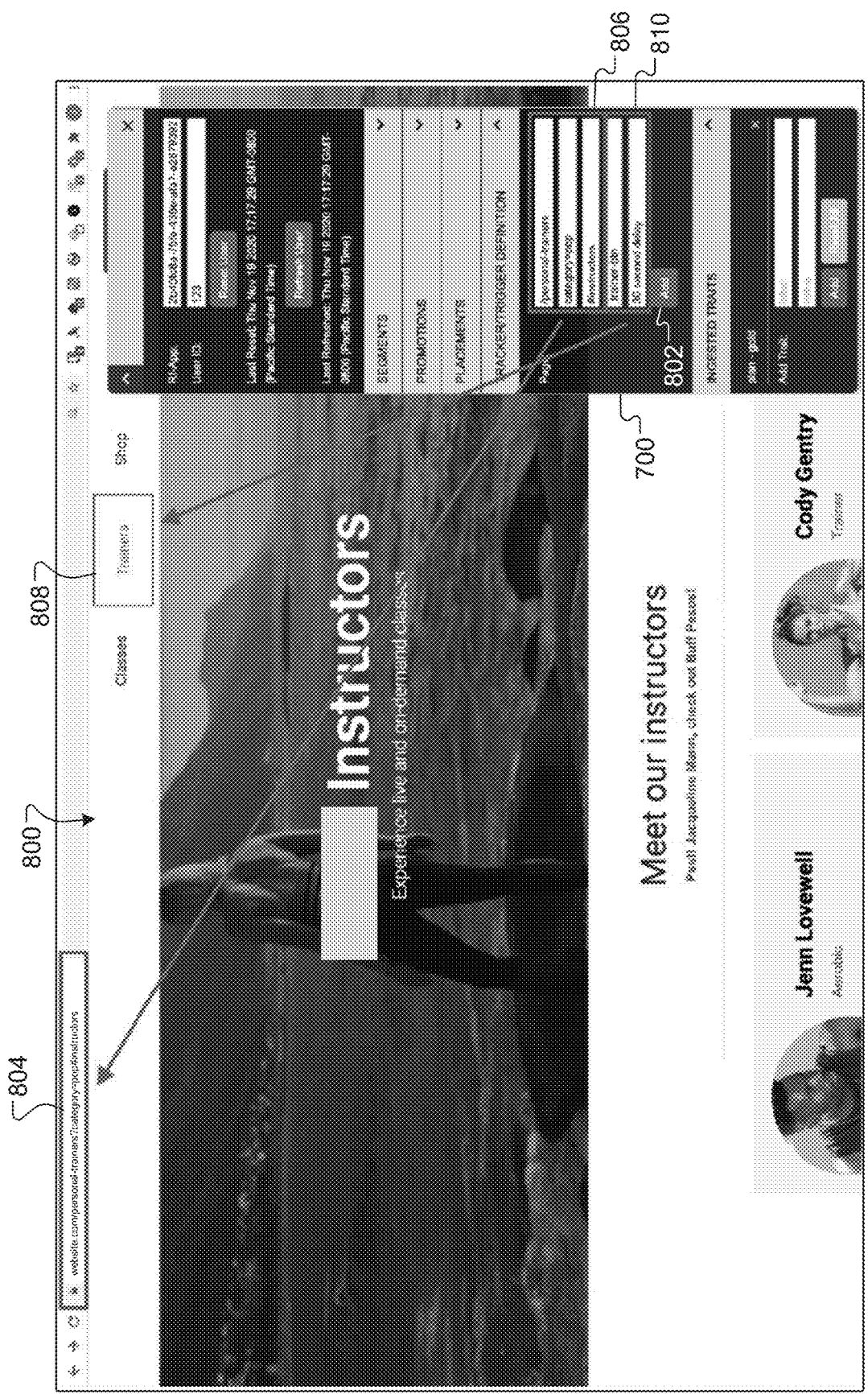
FIG. 8 is a screenshot of an example website and a graphical user interface tool for managing a user experience associated with the website, according to an exemplary embodiment.

For example, referring to FIG. 8, an operator can use the graphical user interface tool 700 to add triggers and trackers by visiting a respective web page 800 and clicking an "Add" button 802 in the graphical user interface tool 700. Visiting the webpage can cause a URL 804 for the webpage to be separated into one or more segments, including path, query, and hash segments, which can be displayed in a first portion 806 of the graphical user interface tool 700. One or more of the URL segment can be removed or converted into a wildcard to loosen acceptance criteria used to determine whether triggers or trackers are activated on the webpage. The graphical user interface tool 700 can allow trackers, triggers, and/or resulting promotions (or other launched content) to be configured quickly and easily by the operator contextually. Additionally or alternatively, the operator may select a webpage element 808 to add a click trigger, for example, through a point-and-click mechanism that visually highlights the element 808. The operator can specify a time delay (e.g., 30 seconds), which can cause the trigger to be activated after the element 808 has been clicked and the time delay has passed. An identification of the element 808 and the time delay can be displayed in a second portion 810 of the graphical user interface tool 700.

Figure 9:
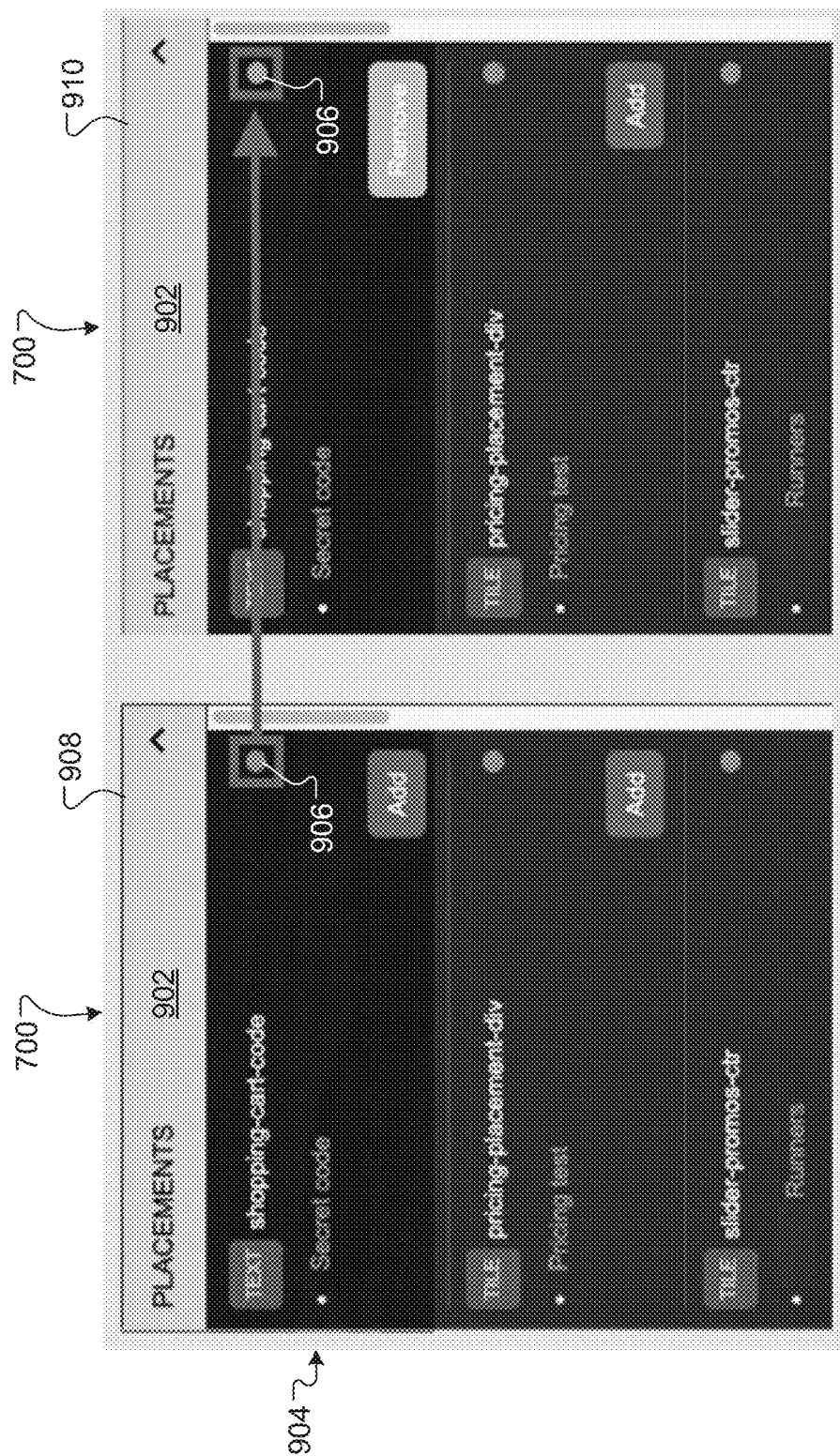
FIG. 9 is a screenshot of an example graphical user interface tool, according to an exemplary embodiment.

Referring to FIG. 9, in some instances, the graphical user interface tool 700 includes a placements tab 902 that allows operators to insert placements (e.g., HTML snippets) onto a webpage, for example, in a point and click mode and/or without requiring technical intervention or manual coding. To add a new placement, an operator can select a placement item 904 in the placements tab 902 from a list of available items, which can be identified by name and/or status. One or more status indicators 906 can indicate whether the webpage already includes any of the placement items. For example, a first color (e.g., gray) for the status indicators 906 can indicate that no placements have been added to the webpage, and a second color (e.g., green) can indicate that one or more placements have already been added to the webpage. FIG. 9 includes two screenshots of the graphical user interface tool 700, with a first screenshot 908 showing a status indicator 906 having a gray color (e.g., before a placement has been added) and a second screenshot 910 showing the status indicator 906 having a green color (e.g., after a placement has been added). The graphical user interface tool 700 can allow the operator to add multiple placements to the webpage, as desired, including multiple instances or duplicates of a single placement item.

Figure 10:
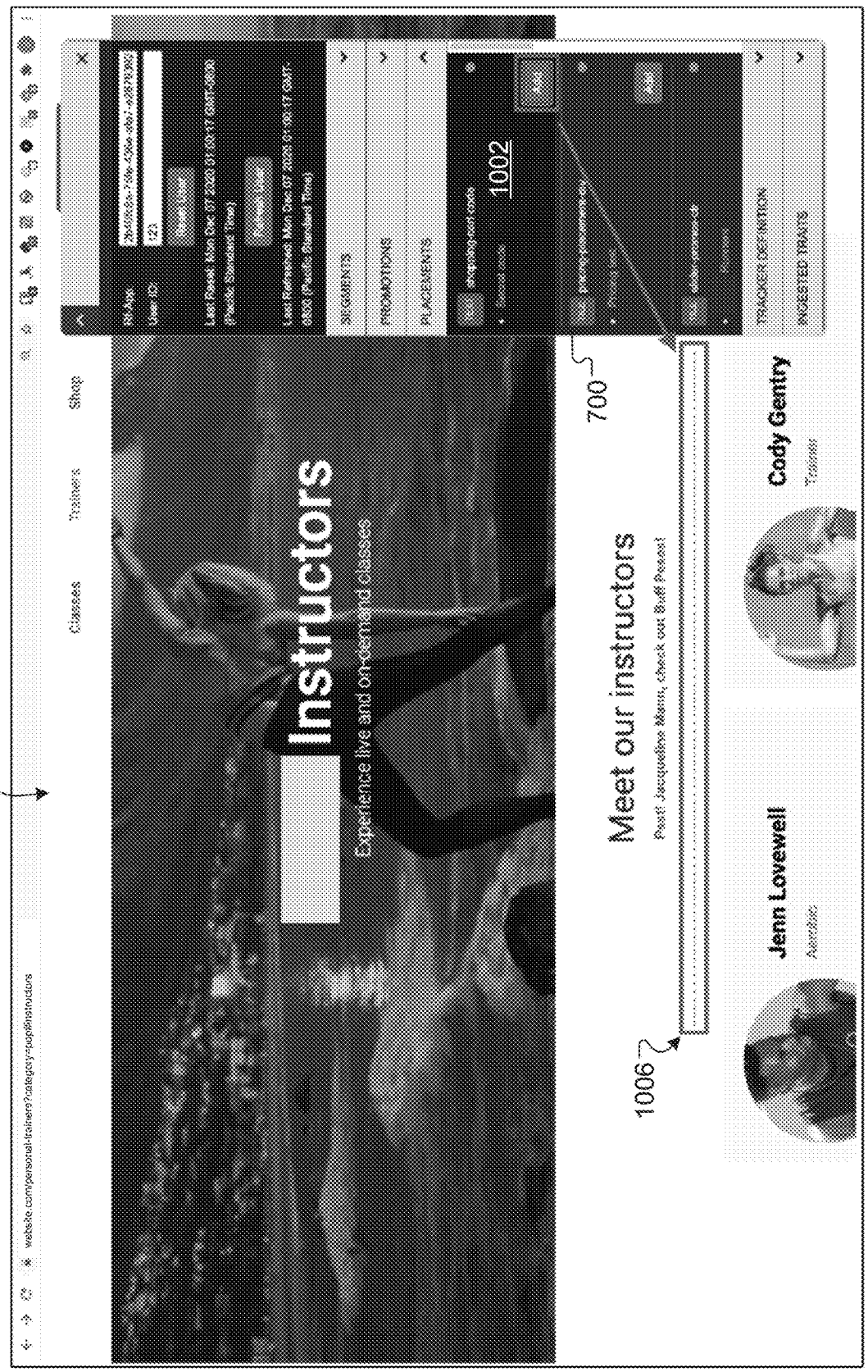
FIG. 10 is a screenshot of an example graphical user interface tool for adding an element to a website, according to an exemplary embodiment.

Referring to FIG. 10, in one example, an operator can select a placement item 1002 from the graphical user interface tool 700 and click on a desire spot 1006 in a webpage where the placement item 1002 should be placed. One or more elements of the webpage 1004 can be highlighted with a visual outline while the operator is choosing the desired location 1006. Once the placement item 1002 has been dropped onto the webpage 1004, the systems and methods described herein can collect coordinates, position or size information (e.g., CSS path coordinates), and/or metadata (e.g., page URL) related to the dropped placement item 1002. Such information can be stored in a database and/or used by the systems and methods to automatically update software code (e.g., HTML code) defining a layout and/or content of the webpage 1004, including the placement item 1002. Once the webpage content has been updated, the placement item 1002 can be visible to one or more users who visit the webpage 1004.

In various examples, the placement item 1002 is added to an original, active version of the webpage 1004, such that a user is able to interact with the active version of the webpage 1004, rather than interacting with a copy of the webpage 1004. The placement item 1002 can be added to the webpage 1004 (e.g., operated by the online service provider 114) via a dynamically inserted <div> (e.g., an HTML div tag) from a server used by the systems and methods described herein (e.g., the server system 112). An operator's act of pointing and clicking to define the location for the placement item 1002 can be recorded and used by the systems and methods to determine where the placement item 1002 should be located. A JAVASCRIPT SDK can be used to keep track of the operator's selection of the placement item 1002 and the desired location. The JAVASCRIPT SDK can then be used to instruct the server (e.g., the server system 112) to combine the placement item 1002 in the desired location with existing content from the website. The updated website can then be rendered on a display of a user client device.

Figure 11:
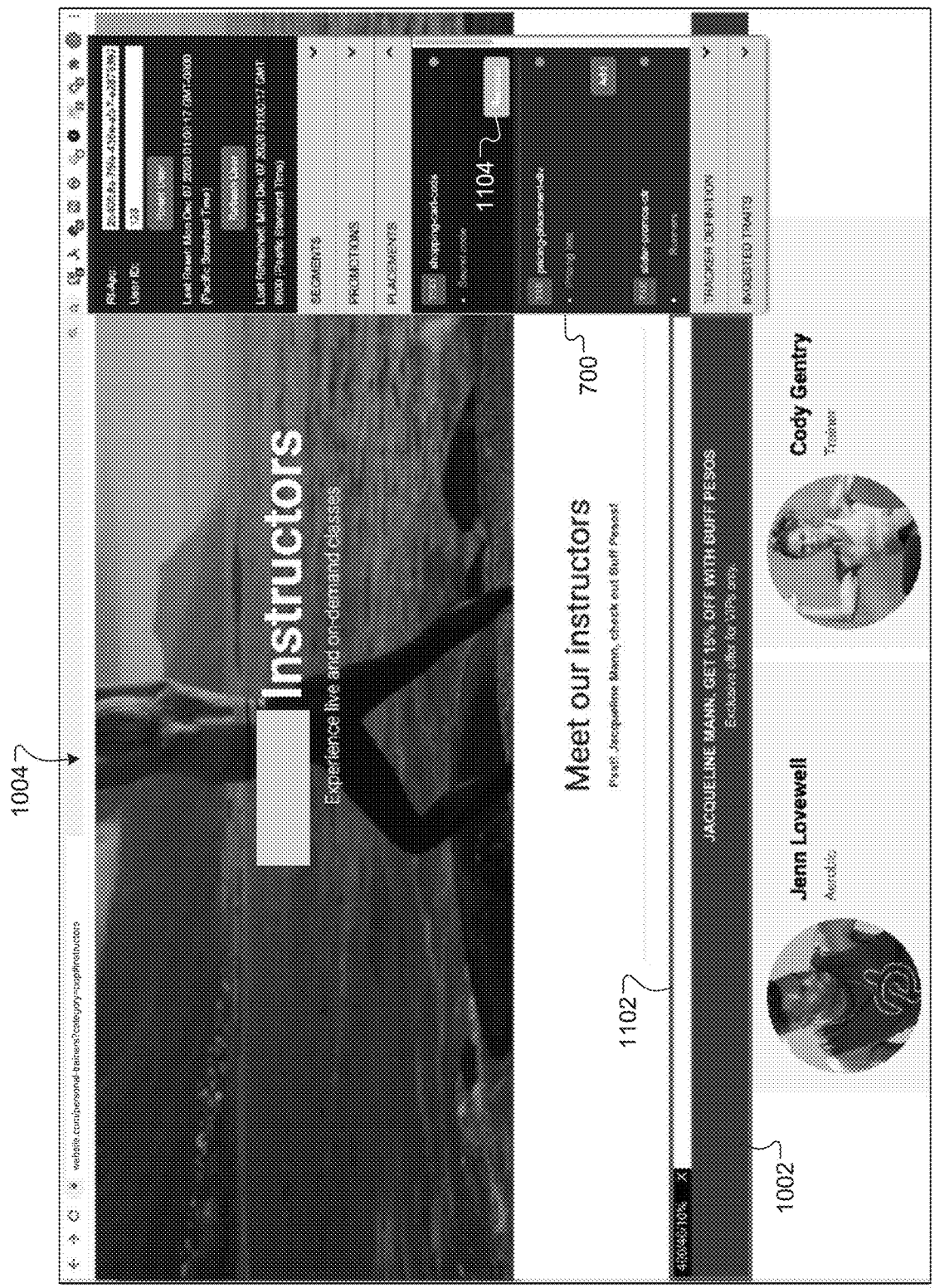
FIG. 11 is a screenshot of a website having an element that was added using a graphical user interface tool, according to an exemplary embodiment.

Referring to FIG. 11, after the placement item 1002 has been dropped on the webpage 1004, a border 1102 of the placement item 1002 can include or display a small tab set that allows the operator to delete the placement item 1002 and/or view one or more statistics or other data associated with the placement item 1002. Such data can include, for example, estimated traffic, position information, size information, etc. The operator can toggle the border on or off, for example, by selecting the border. To remove the placement item 1002 from the webpage 1004, the operator can tap or click a remove button 1104 in the graphical user interface tool 700. The systems and methods described herein can then automatically remove the placement item 1002 from the webpage 1004, make corresponding changes to HTML or other webpage code, and/or clean up any reference to the placement item 1002 (e.g., in a backend). In some instances, for example, the backend (e.g., the server system 112) can store details about where the placement item 1002 was inserted on the webpage 1004 by tracking an HTML selector and a position (e.g., relative to a reference selector) the operator selected during the insertion process, and this information can be stored in a database (e.g., the user data 126 database and/or the content data 128 database). When the operator tries to remove the placement item 1002, placement information in HTML for the placement item 1002 can be compared against information stored in the database. When the information is determined to match, a reference to the placement item 1002 in the database can be removed, and the operator's website can be updated in real time (e.g., using the SDK), to remove the placement item 1002 from the webpage 1004.

In some implementations, operators can customize different behaviors associated with the graphical user interface tool 700 when adding placements to webpages. For example, an operator can specify a position where a placement item will be inserted relative to one or more highlighted elements in a webpage. The specified position can be, for example, before, after, to the right of, or to the left of the highlighted element. Additionally or alternatively, the operator can instruct the graphical user interface tool 700 to replace the highlighted element with the added placement item. Operators can customize an appearance of a placement item, for example, by modifying Cascading Style Sheets (CSS) or other layout or appearance parameters (e.g., border and background colors or textures, font size, font type, etc.) directly in the graphical user interface tool 700, at a scoped or global level. This can provide the operator with fine-grained control of placement appearance, with real-time feedback. For example, the operator can review and edit the appearance, as desired, using the graphical user interface tool 700.

The preview capability can be used by operators to validate website content or perform quality testing to confirm that placements are being displayed properly to one or more selected segments of users. The preview capability can include a user identification (ID) override feature that allows an operator to impersonate or step into the shoes of a specific end user associated with a selected segment. In some examples, the override feature can determine user characteristics for the specific end user and temporarily set an operator's user characteristics to be identical to the user characteristics for the specific end user. For example, the operator can access a database (e.g., the user data 126 database) to search for users who have one or more user traits. Once a user has been identified, the operator can then use the real-time tool to access the website using a user ID for the user. This enables the operator to view website content as it would appear to the user (e.g., as an emulation), without having to log in as or authenticate into a real end user account to preview the website, including any placements, promotions, or other content specific to the end user. This can allow the operator to verify website modifications made using the graphical user interface tool 700, without a need for outside technical consultation.

Figure 12:
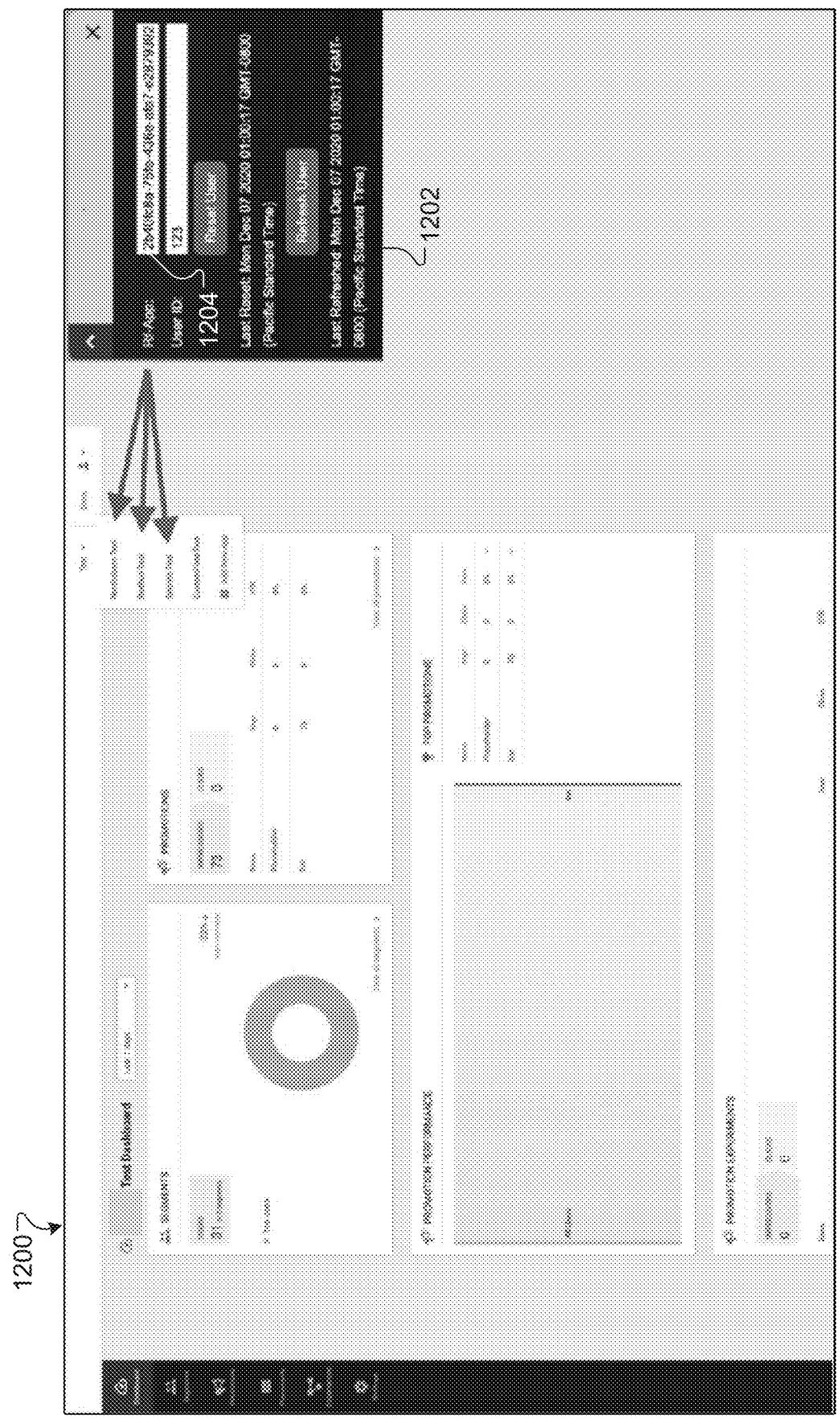
FIG. 12 is a screenshot of an example dashboard for implementing an app ID override feature, according to an exemplary embodiment.

Referring to FIG. 12, in various examples, a website testing dashboard 1200 and a graphical user interface tool 1202 can be used to implement an application ID override feature that allows an operator to switch from one website or web application to another, for example, to facilitate testing of different online services or website environments, such as development, test, and/or production environments. While each website or application may be isolated by default, the application ID override feature can allow for temporary interoperability with a separate application while the graphical user interface tool 1202 is in use. In some instances, for example, the graphical user interface tool 1202 includes an application ID field 1204 for implementing the application ID override feature. To switch to a desired website, the operator can enter a value for the web application in the application ID field 1204 and be automatically given access to the website. This capability can be useful for operators who manage more than one online service or who wish to access multiple versions of a single online service.

In some instances, for example, the application ID override feature can allow an operator to test two applications, such as a staging application and a production application, and each application can have a separate application ID. The operator can specify the application ID and use the application override feature to test staging promotions on the staging application, which may not be 100% ready for the operator's live environment. This can allow the operator to more easily validate new content in the staging application before the new content is implemented in the production application.

Figure 13:
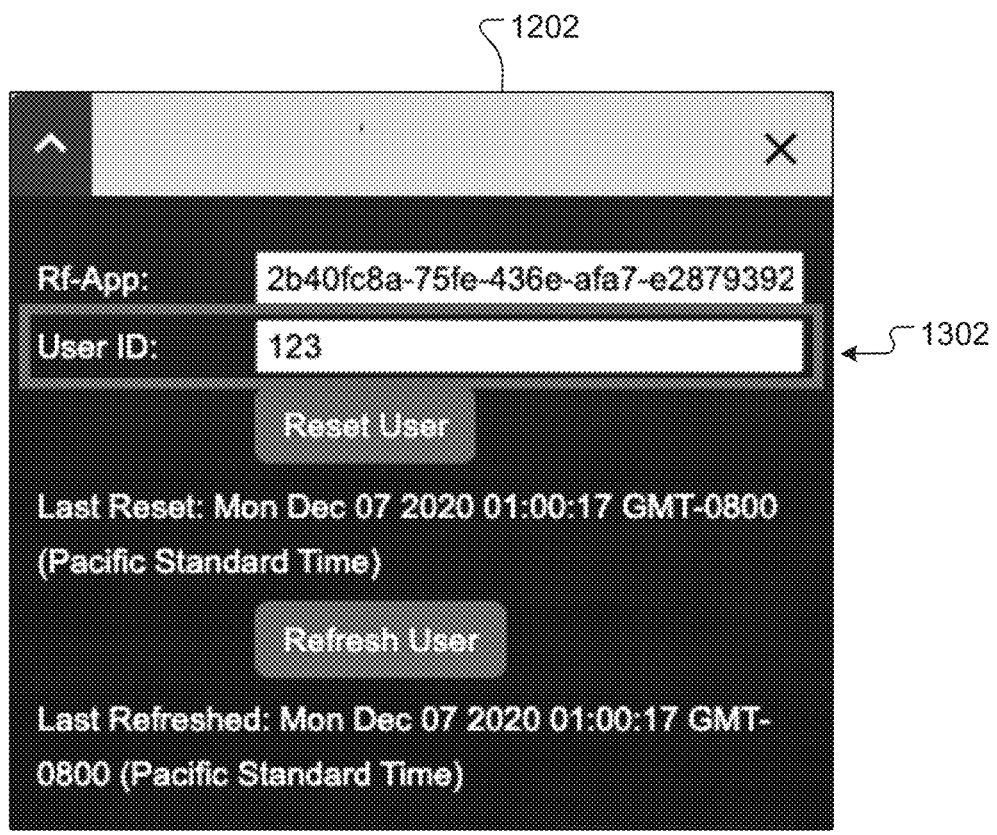
FIG. 13 is a screenshot of an example graphical user interface for implementing a user ID override feature, according to an exemplary embodiment.

Likewise, referring to FIG. 13, the graphical user interface tool 1202 can include a user ID field for implementing the end user ID override feature. The operator can select a user ID for a known end user or an anonymous user and enter the user ID in a user ID field 1302. An internal data streaming pipeline can then determine a user segment and/or user traits associated with the user ID and provide the operator with a version of a website as it would be experienced by the user, including any promotions and placements. Since the operator can be already authenticated as an administrator of the admin console, described herein, it is not necessary for the operator to re-login to the web application as the user. Instead, the operator can enter user IDs for various types of users (e.g., paid user, free user, etc.) in the user ID field 1302 and receive a website experience corresponding to the end user type. In some implementations, by knowing the end user ID, the operator can directly change how an SDK (e.g., a JAVASCRIPT SDK) for the operator's browser client interacts with the web application. For example, the SDK can respond to a new user ID by first sending a request to a backend of the systems and methods described herein (e.g., the server system 112) to request new data, if such data is unavailable (e.g., given that the user ID is now different). The SDK can then make further requests to retrieve the updated data from the backend. The backend can then provide the operator with segments, promotions, and/or metadata pertaining to the particular user ID, as if the operator had logged in as the user with the user ID. This can emulate the user's experience of the website.

Figure 14:
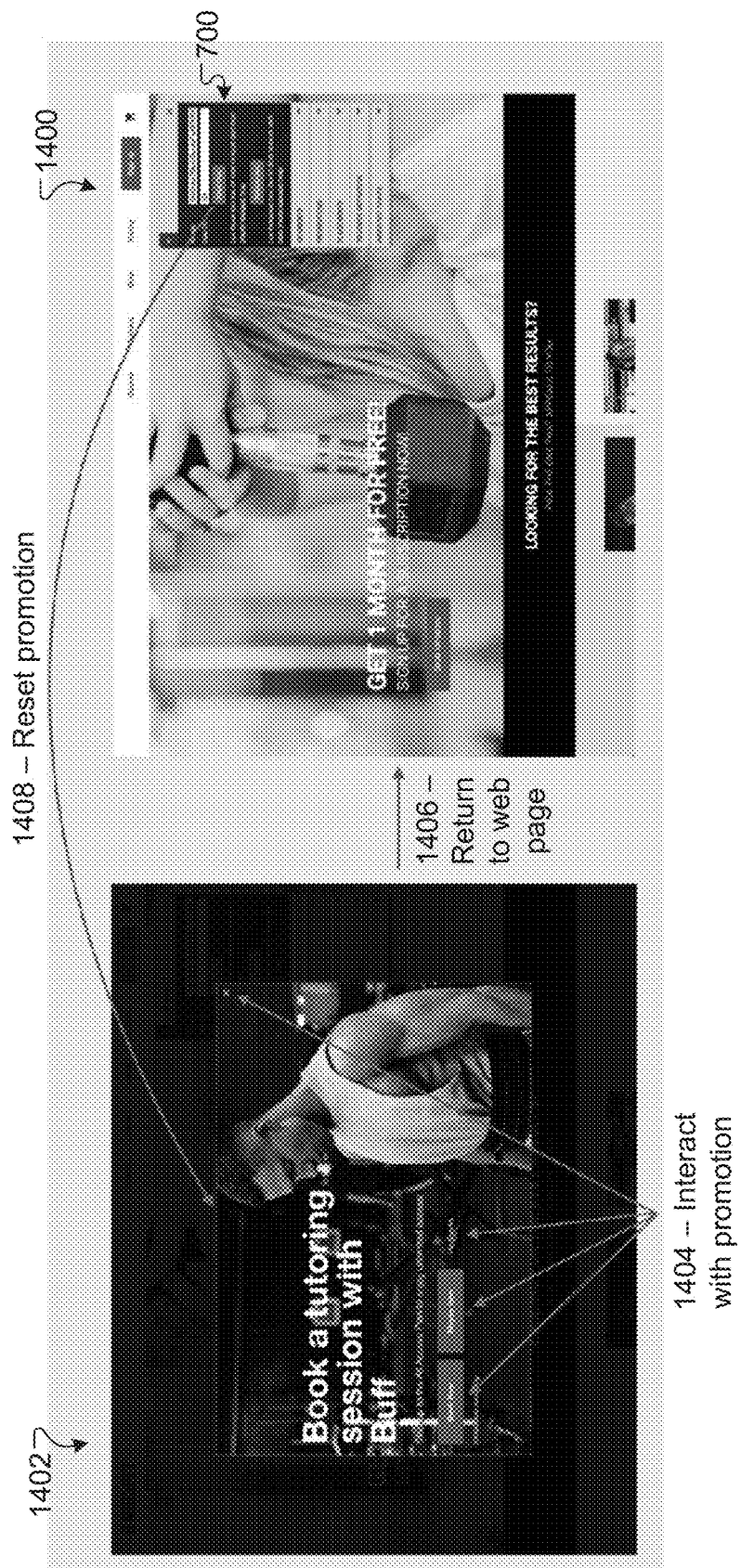
FIG. 14 is a screenshot of an example method of using a graphical user interface tool to reset one or more elements of an online service, according to an exemplary embodiment.

Referring to FIG. 14, in various examples, the graphical user interface tool 700 can provide a reset functionality and a refresh functionality. The reset functionality can allow an operator to interact multiple times with promotions (which can be ephemeral by nature) and placements on a webpage 1400. Multiple interactions can be desirable in some instances for testing purposes. For example, an operator may wish to preview a promotion 1402 that is configured to be presented to end users for 30 seconds and then disappear permanently. The operator can interact (step 1404) with the promotion 1402 during an initial 30-second presentation. The promotion can then disappear and the webpage 1400 can be displayed again (step 1406), without the promotion 1402. Next, the operator can press a user reset button on the graphical user interface tool 700 that causes the promotion 1402 to be presented again (step 1408) for another 30 seconds. Advantageously, the graphical user interface tool 700 can allow the operator to revisit and interact with the promotion 1402 multiple times, as needed, to confirm the promotion 1402 is configured properly. Additionally or alternatively, placements that are configured to hide upon user interaction can be reset using the reset functionality. For example, a placement that would normally disappear after a user interacts with the placement can be presented to the operator repeatedly through use of the graphical user interface tool 700.

In various examples, the refresh functionality can forcibly re-fetch end user data to improve a feedback loop during testing. Normally, each operator can have a different setting for sync interval (e.g., 1 minute, 2 minutes, or 5 minutes), which means responsiveness can differ depending on requirements. Refresh can forcibly accelerate data fetching for the end user currently being impersonated. In general, the refresh functionality can be used to refresh website content when an operator changes user ID to experience a website as a different user. When a new user ID is entered, for example, the website content and/or the systems and methods described herein may need to be refreshed, so that a new emulation can be performed (e.g., using the server system 112). Refresh can cause the emulation to load immediately, rather than requiring the operator to wait a period of time before the emulation is loaded.

Figure 15:
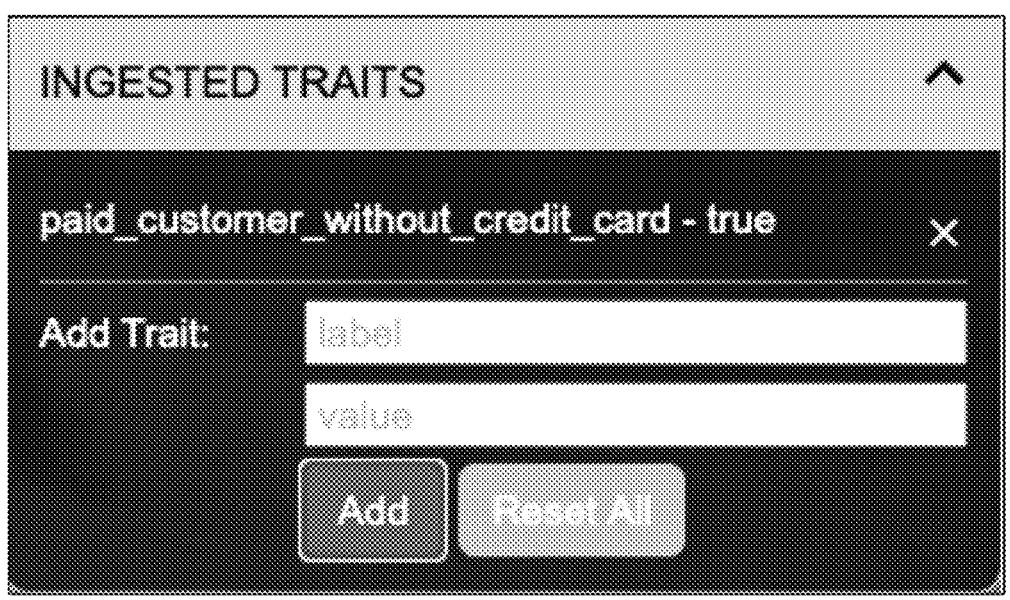
FIG. 15 is a screenshot of an example graphical user interface for ingesting user traits, according to an exemplary embodiment.

In certain implementations, operators can overwrite existing traits for end users within the system described herein, for example, to simulate different end user life cycle journeys. For example, it can be helpful to understand how a user experience in an online service (e.g., a website, web application, or mobile app) can change when an end user moves to a different user segment (e.g., from a paid end user segment to an unpaid end user segment). Understanding such changes can allow operators to ensure that the changes to the user experience are not too disruptive and do not cause users to churn. Referring to FIG. 15, to simulate such changes, an operator can use an ingested traits graphical user interface 1500 to define one or more new traits for a user (e.g., a hypothetical user). The newly defined traits can then be sent to an ingestion pipeline for import. The ingestion pipeline can process the new traits and provide the operator with information describing the new segment, promotions, and/or placements associated with the user, as a result of the new traits. The operator can then review the new user segment, promotions, and placements to confirm that the user experience will be appropriate. For example, if the updates will likely lead to user churn, changes to the promotions and placements can be made in an effort to improve the user experience.

Figure 16:
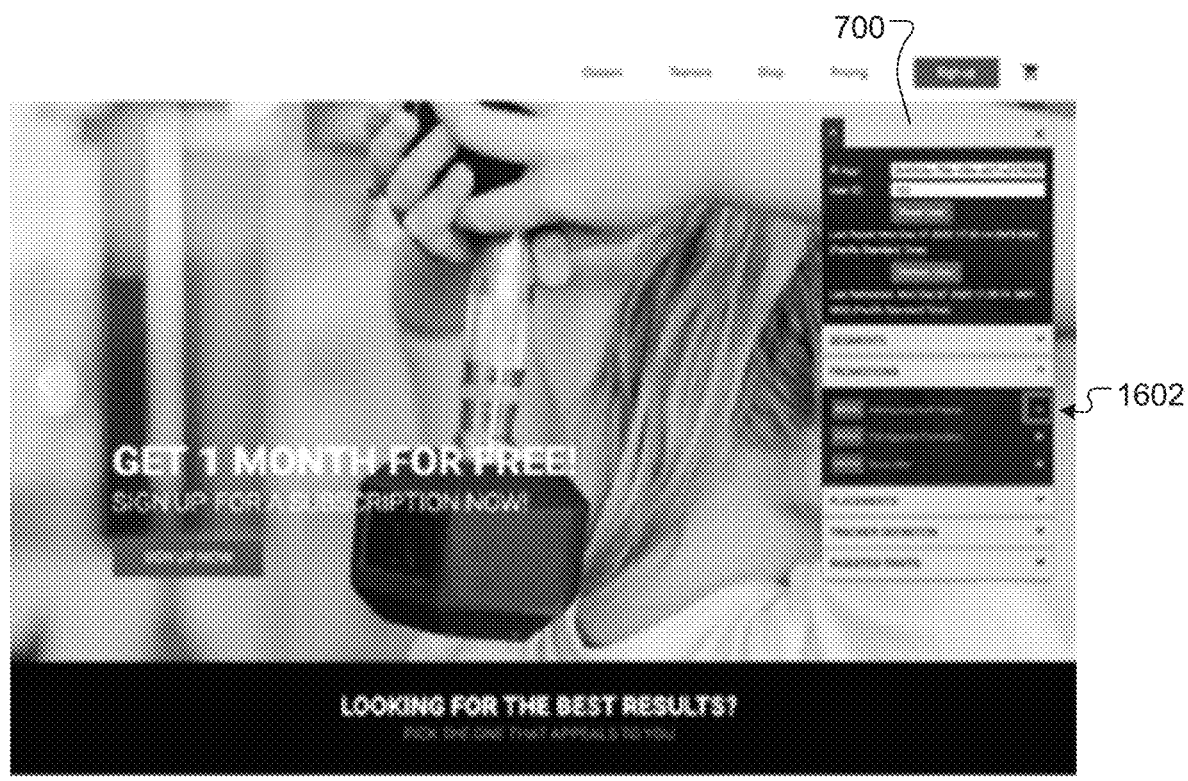
FIG. 16 is a screenshot of an example graphical user interface tool that provides status identifiers for one or more webpage elements, according to an exemplary embodiment.

Referring to FIG. 16, in certain instances, the graphical user interface tool 700 can include one or more status identifiers 1602 that indicate a current status of one or more promotions and/or placements. The status identifiers 1602 can indicate, for example, whether an operator has interacted with an available promotion or placement. For example, a status identifier 1602 for a promotion can change colors (e.g., from green to red) once the operator has interacted with the promotion. Managing promotions and placements can be challenging and can result in significant mental overhead for operators. Advantageously, by providing status identifiers on the graphical user interface tool 700, operators can quickly and easily understand a current state of the entire end user experience.

Figure 17:
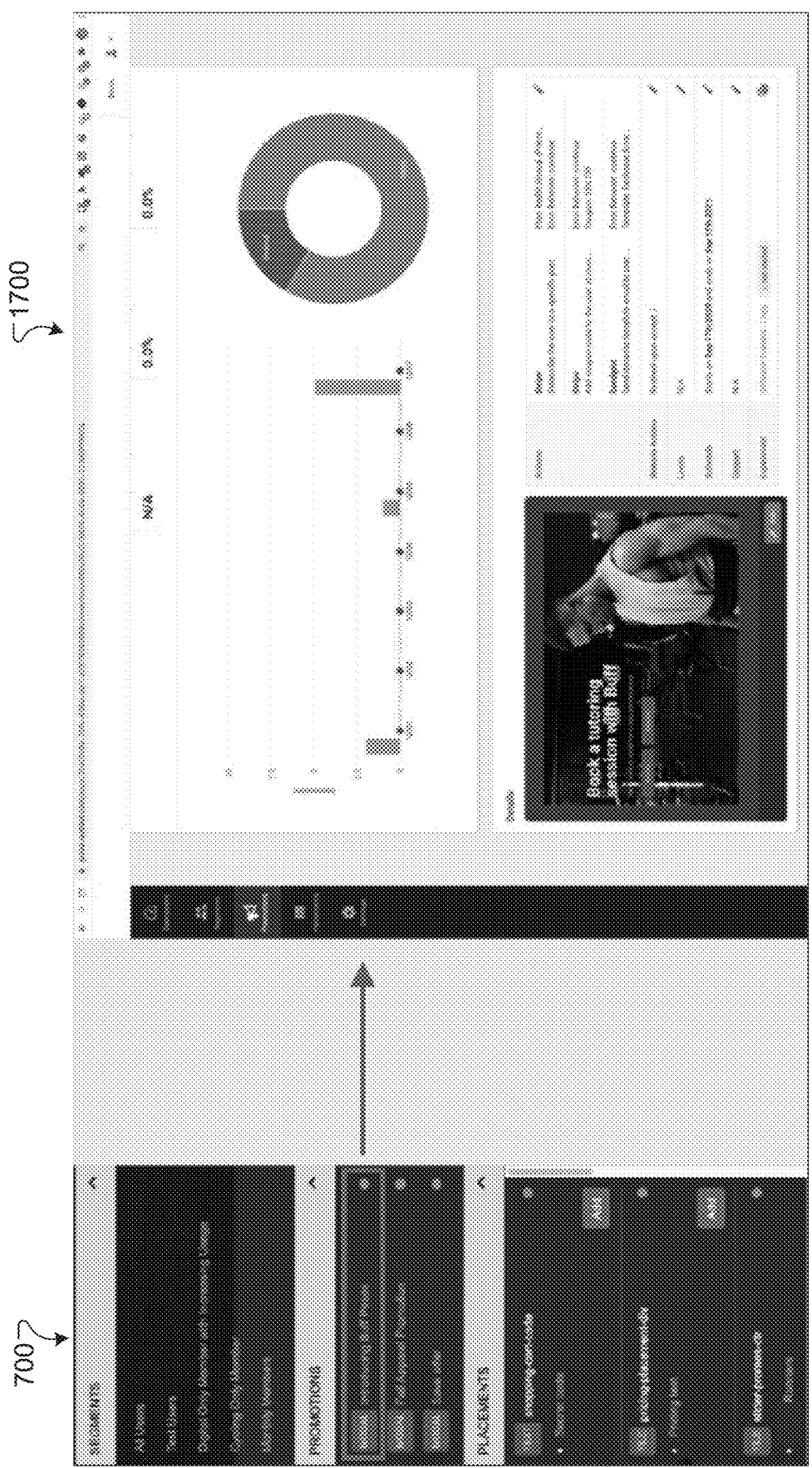
FIG. 17 is a screenshot of an example graphical user interface tool and an admin console for managing an online user experience, according to an exemplary embodiment.

Referring to FIG. 17, in certain examples, a user can select or click on one or more items in the graphical user interface tool 700 and be provided with an admin console 1700, where the operator can review and revise statistics and/or functionality related to promotions, placements, segments, or other items. For example, in the case of a promotion, the admin console 1700 can provide a comprehensive view of the promotion, allowing the operator to determine the impact that the promotion (or any changes made to the promotion) has had on one or more users or user segments. The admin console 1700 can display, for example, statistics related to user interactions with the promotion and/or subsequent user activities associated with the website.

In various examples, the real-time tool described herein can be activated upon integration of an SDK (e.g., a Javascript SDK) into the operator's web application, app, or other online service (e.g., with no coding performed by the operator). Authentication into the admin console can carry over to the real-time tool running on the operator's online service. This can prevent unauthorized access of the real-time tool and/or can allow for entitlements and access levels to be defined for the admin console operator. The authentication process can utilize a two-way application programming interface (API) communication channel between the real-time tool and the admin console.

Figure 18:
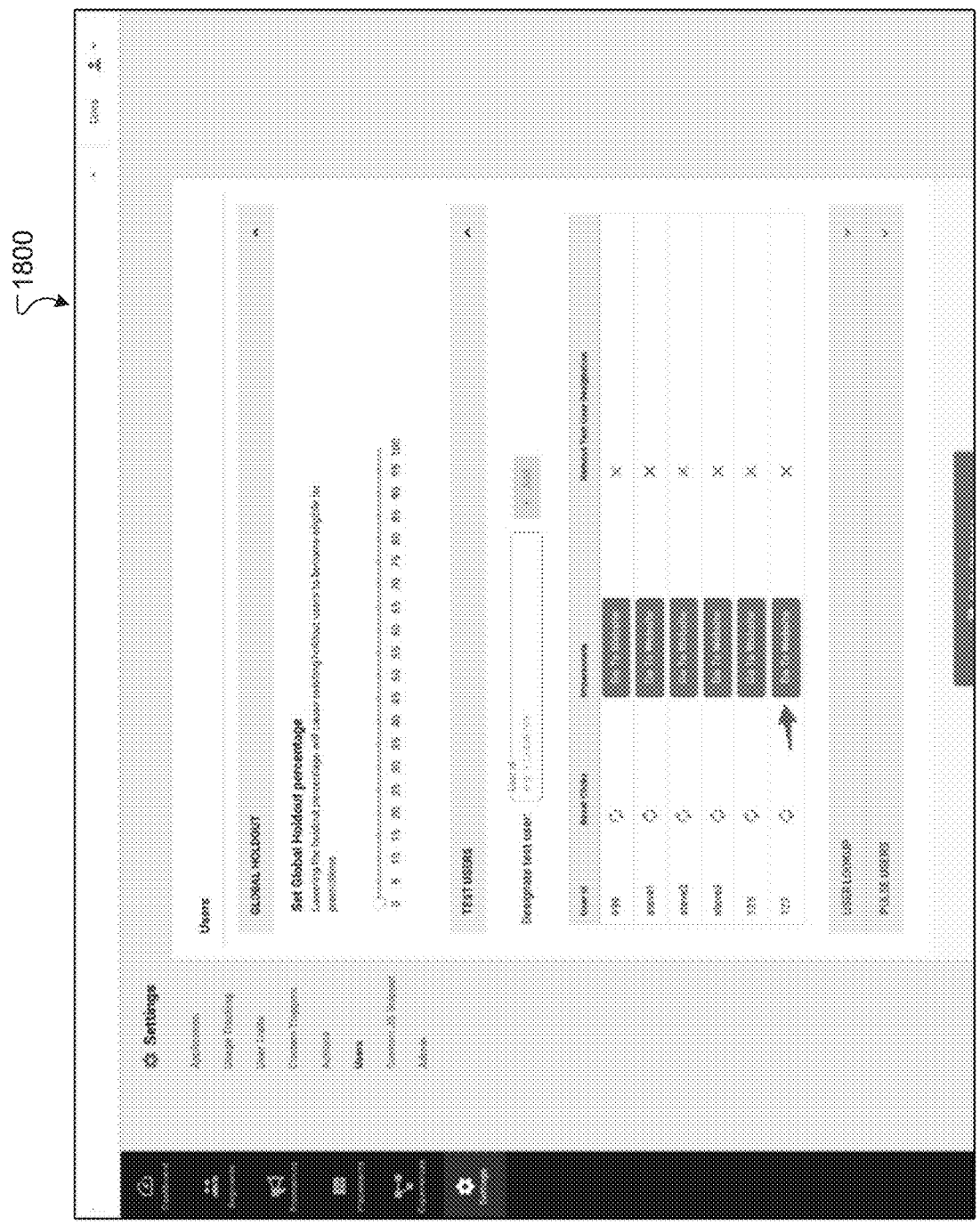
FIG. 18 is a screenshot of an example admin console for initiating a real-time tool for managing an online user experience, according to an exemplary embodiment.
Figure 19:
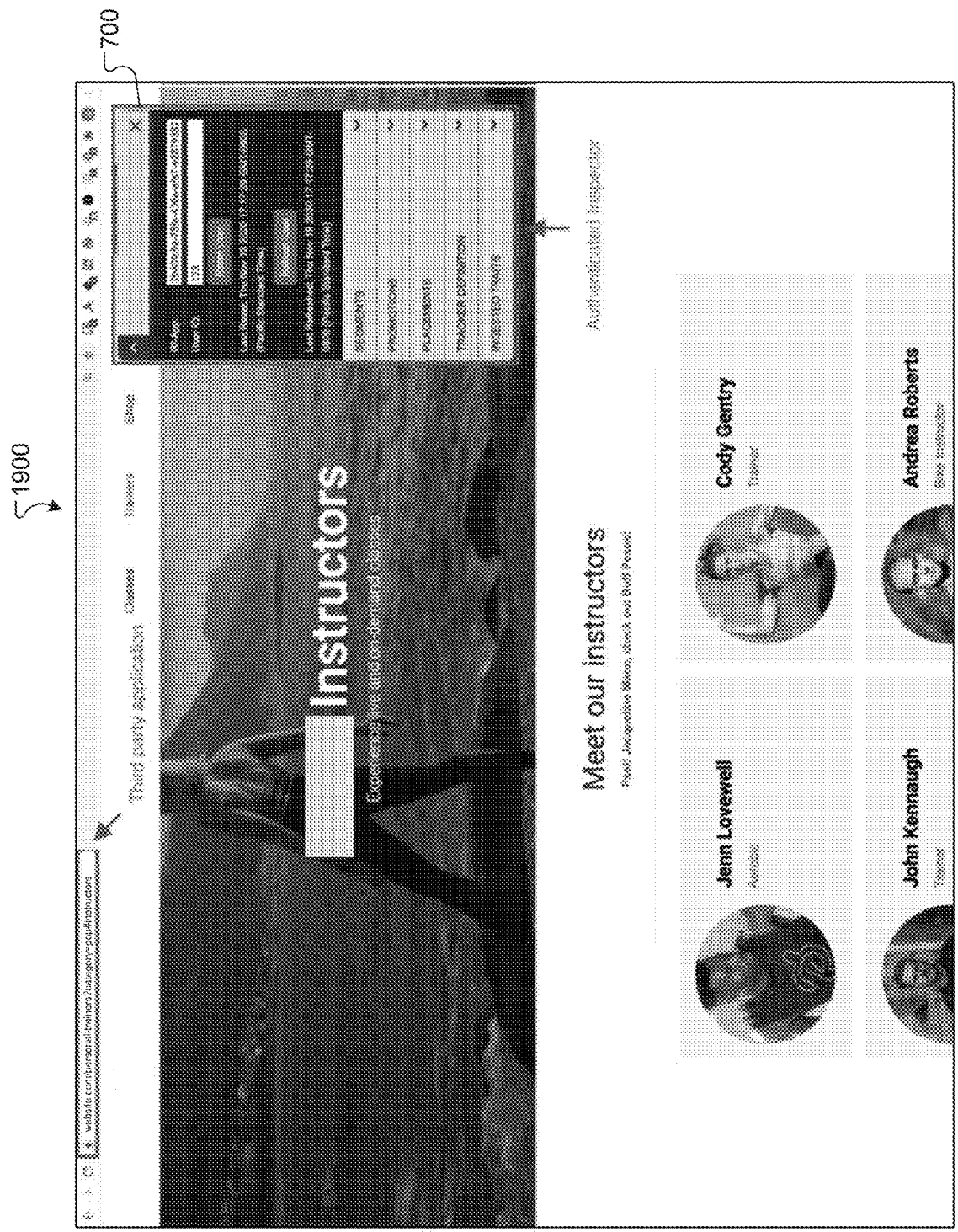
FIG. 19 is a screenshot of an example graphical user interface tool rendered as an overlay window on a webpage, according to an exemplary embodiment.

Referring to FIGS. 18 and 19, once authenticated, an operator can select the real-time tool in an admin console 1800. A real-time tool session with authentication key and entitlements can then be initiated via a payload transmitted between the admin console 1800 and the real-time tool. The payload can then be received by the real-time tool on the operator's web application, which can be subsequently validated against an API for the admin console 1800. After successful payload validation, the graphical user interface tool 700 can be rendered (e.g., as an overlay window) directly on or adjacent to a window displaying the operator's website or web application 1900. A communication channel can be established between the real-time tool and the admin console API so that the real-time tool can present and save real-time updates to and/or from the admin console.

Figure 20:
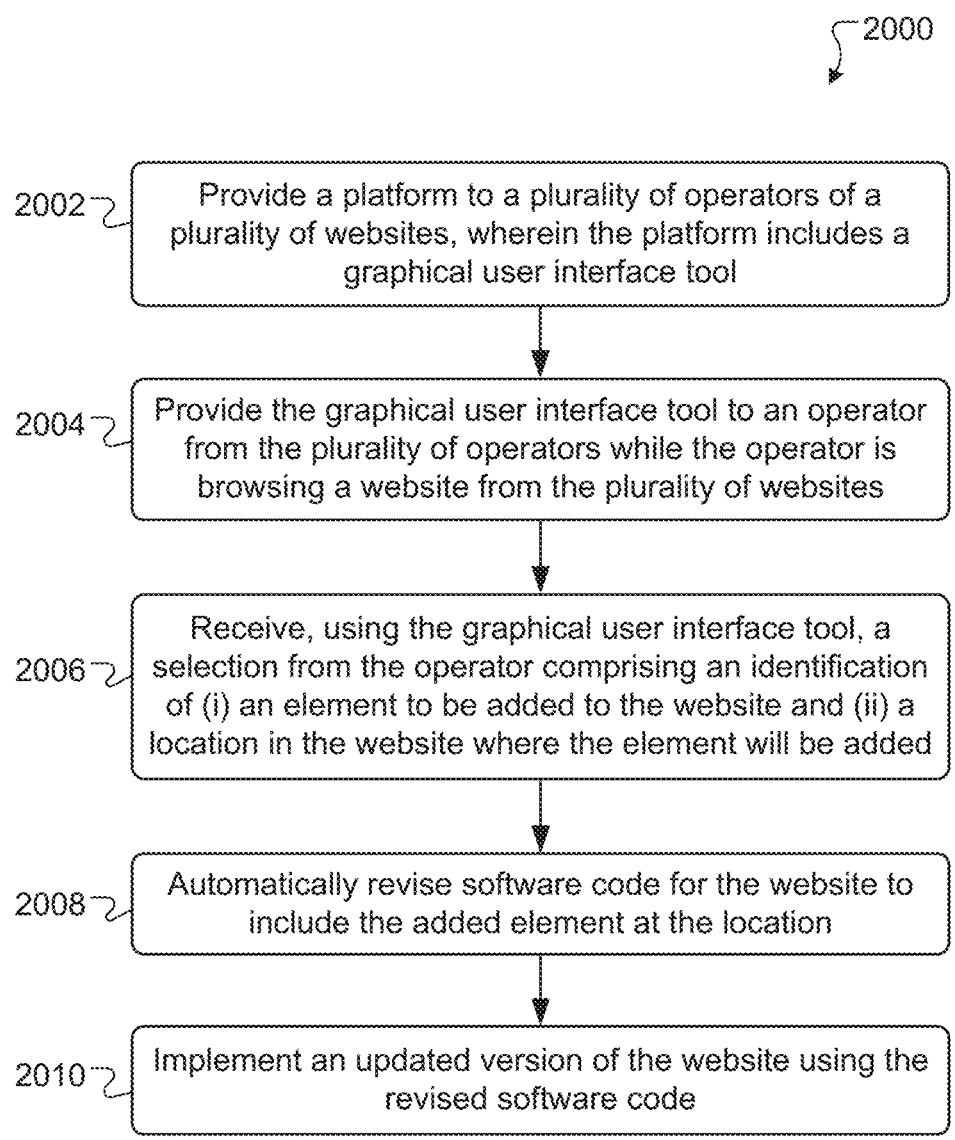
FIG. 20 is a flowchart of an example method of managing an online experience, according to an exemplary embodiment.

FIG. 20 is a flowchart of an example method 2000 of managing an online experience. A platform is provided (step 2002) to a plurality of operators of a plurality of websites. A graphical user interface tool for the platform is provided (step 2004) to an operator from the plurality of operators while the operator is browsing a website from the plurality of websites. Using the graphical user interface tool, a selection is received (step 2006) from the operator that includes an identification of (i) an element to be added to the website and (ii) a location in the website where the element will be added. In response to the selection, software code for the website is automatically revised (step 2008) to include the added element at the location. An updated version of the website is implemented (step 2010) using the revised software code.

Computer-Based Implementations

In some examples, some or all of the processing described above can be carried out on a personal computing device, on one or more centralized computing devices, or via cloud-based processing by one or more servers. Some types of processing can occur on one device and other types of processing can occur on another device. Some or all of the data described above can be stored on a personal computing device, in data storage hosted on one or more centralized computing devices, and/or via cloud-based storage. Some data can be stored in one location and other data can be stored in another location. In some examples, quantum computing can be used and/or functional programming languages can be used. Electrical memory, such as flash-based memory, can be used.

Figure 21:
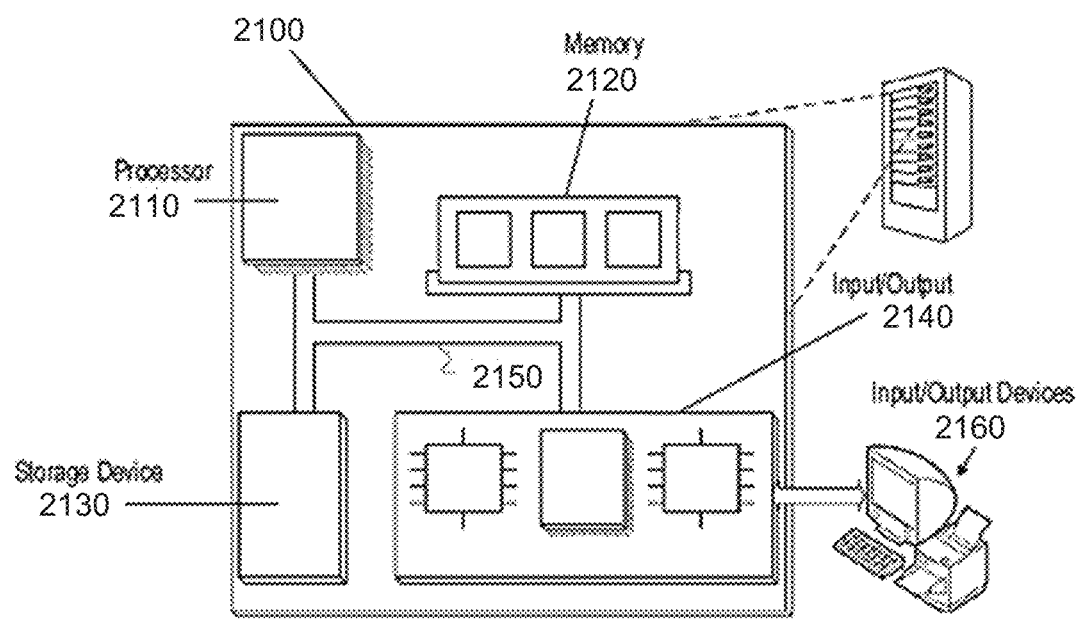
FIG. 21 is a block diagram of an example computer system, according to an exemplary embodiment.

FIG. 21 is a block diagram of an example computer system 2100 that may be used in implementing the technology described herein. General-purpose computers, network appliances, mobile devices, or other electronic systems may also include at least portions of the system 2100. The system 2100 includes a processor 2110, a memory 2120, a storage device 2130, and an input/output device 2140. Each of the components 2110, 2120, 2130, and 2140 may be interconnected, for example, using a system bus 2150. The processor 2110 is capable of processing instructions for execution within the system 2100. In some implementations, the processor 2110 is a single-threaded processor. In some implementations, the processor 2110 is a multi-threaded processor. The processor 2110 is capable of processing instructions stored in the memory 2120 or on the storage device 2130.

The memory 2120 stores information within the system 2100. In some implementations, the memory 2120 is a non-transitory computer-readable medium. In some implementations, the memory 2120 is a volatile memory unit. In some implementations, the memory 2120 is a non-volatile memory unit.

The storage device 2130 is capable of providing mass storage for the system 2100. In some implementations, the storage device 2130 is a non-transitory computer-readable medium. In various different implementations, the storage device 2130 may include, for example, a hard disk device, an optical disk device, a solid-state drive, a flash drive, or some other large capacity storage device. For example, the storage device may store long-term data (e.g., database data, file system data, etc.). The input/output device 2140 provides input/output operations for the system 2100. In some implementations, the input/output device 2140 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 2160. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 2130 may be implemented in a distributed way over a network, such as a server farm or a set of widely distributed servers, or may be implemented in a single computing device.

Although an example processing system has been described in FIG. 21, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
   providing a platform to a plurality of operators of a plurality of websites, the platform comprising a graphical user interface tool;
   providing the graphical user interface tool to an operator from the plurality of operators while the operator is browsing a website from the plurality of websites, wherein the website comprises a plurality of versions, and wherein each version from the plurality of versions is accessible to a respective user segment from a plurality of user segments;
   receiving, using the graphical user interface tool, a selection from the operator comprising an identification of (i) an element to be added to the website and (ii) a location in the website where the element will be added;
   receiving an instruction from the operator indicating that the element will be accessible to a first segment of users from the plurality of user segments and inaccessible to a second segment of users from the plurality of user segments;
   enabling the operator to preview a first version of the website by impersonating a first user from the first segment of users and preview a second version of the website by impersonating a second user from the second segment of users;
   in response to the selection and the instruction, automatically revising software code for the website to include the added element at the location; and
   implementing an updated version of the website using the revised software code.

2. The method of claim 1, wherein providing the graphical user interface tool comprises providing the graphical user interface tool and the website on a display simultaneously.

3. The method of claim 1, wherein the selection comprises (i) a selection in the graphical user interface tool of the element to be added and (ii) a selection in the website of the location.

4. The method of claim 1, wherein the selection comprises a point and click from the graphical user interface tool to the location in the website.

5. The method of claim 1, wherein the selection further comprises an identification of a user or a user segment for the website, and wherein implementing the updated version comprises providing the updated version to the first segment of users while retaining a previous version of the website for the second segment of users.

6. The method of claim 1, wherein the element comprises a tracker configured to track user interaction with a portion of the website.

7. The method of claim 1, wherein the element comprises a trigger configured to initiate a presentation of content on the website.

8. The method of claim 1, wherein the element comprises a placement comprising at least one of text, an image, or a window.

9. The method of claim 8, wherein the placement comprises an HTML snippet.

10. The method of claim 1, wherein impersonating the first user comprises ingesting user traits for the first segment of users, and wherein impersonating the second user comprises ingesting user traits for the second segment of users.

11. A system comprising:
    one or more computer systems programmed to perform operations comprising:
      providing a platform to a plurality of operators of a plurality of websites, the platform comprising a graphical user interface tool;
      providing the graphical user interface tool to an operator from the plurality of operators while the operator is browsing a website from the plurality of websites, wherein the website comprises a plurality of versions, and wherein each version from the plurality of versions is accessible to a respective user segment from a plurality of user segments;
      receiving, using the graphical user interface tool, a selection from the operator comprising an identification of (i) an element to be added to the website and (ii) a location in the website where the element will be added;
      receiving an instruction from the operator indicating that the element will be accessible to a first segment of users from the plurality of user segments and inaccessible to a second segment of users from the plurality of user segments;
      enabling the operator to preview a first version of the website by impersonating a first user from the first segment of users and preview a second version of the website by impersonating a second user from the second segment of users;
      in response to the selection and the instruction, automatically revising software code for the website to include the added element at the location; and
      implementing an updated version of the website using the revised software code.

12. The system of claim 11, wherein providing the graphical user interface tool comprises providing the graphical user interface tool and the website on a display simultaneously.

13. The system of claim 11, wherein the selection comprises (i) a selection in the graphical user interface tool of the element to be added and (ii) a selection in the website of the location.

14. The system of claim 11, wherein the selection comprises a point and click from the graphical user interface tool to the location in the website.

15. The system of claim 11, wherein the selection further comprises an identification of a user or a user segment for the website, and wherein implementing the updated version comprises providing the updated version to the first segment of users while retaining a previous version of the website for the second segment of users.

16. The system of claim 11, wherein the element comprises a tracker configured to track user interaction with a portion of the website.

17. The system of claim 11, wherein the element comprises a trigger configured to initiate a presentation of content on the website.

18. The system of claim 11, wherein the element comprises a placement comprising at least one of text, an image, or a window.

19. The system of claim 11, wherein impersonating the first user comprises ingesting user traits for the first segment of users, and wherein impersonating the second user comprises ingesting user traits for the second segment of users.

20. A non-transitory computer-readable medium having instructions stored thereon that, when executed by one or more computer processors, cause the one or more computer processors to perform operations comprising:

provlding a platform to a plurality of operators of a plurality of websites, the platform comprising a graphical user interface tool;

providing the graphical user interface tool to an operator from the plurality of operators while the operator is browsing a website from the plurality of websites, wherein the website comprises a plurality of versions, and wherein each version from the plurality of versions is accessible to a respective user segment from a plurality of user segments;

receiving, using the graphical user interface tool, a selection from the operator comprising an identification of (i) an element to be added to the website and (ii) a location in the website where the element will be added;

receiving an instruction from the operator indicating that the element will be accessible to a first segment of users from the plurality of user segments and inaccessible to a second segment of users from the plurality of user segments;

enabling the operator to preview a first version of the website by impersonating a first user from the first segment of users and preview a second version of the website by impersonating a second user from the second segment of users;

in response to the selection and the instruction, automatically revising software code for the website to include the added element at the location; and implementing an updated version of the website using the revised software code.

* * * * *